United States Patent
Halwes

(10) Patent No.: US 9,393,858 B2
(45) Date of Patent: Jul. 19, 2016

(54) INFINITELY VARIABLE TRANSMISSION

(71) Applicant: Dennis Ray Halwes, Arlington, TX (US)

(72) Inventor: Dennis Ray Halwes, Arlington, TX (US)

(*) Notice: Subject to any disclaimer, the term of this patent is extended or adjusted under 35 U.S.C. 154(b) by 0 days.

(21) Appl. No.: 14/793,088

(22) Filed: Jul. 7, 2015

(65) Prior Publication Data

US 2015/0306947 A1 Oct. 29, 2015

Related U.S. Application Data

(63) Continuation of application No. 13/356,425, filed on Jan. 23, 2012, now Pat. No. 9,085,225.

(51) Int. Cl.

| | |
|---|---|
| *B60K 6/36* | (2007.10) |
| *F16H 3/76* | (2006.01) |
| *B60W 20/00* | (2016.01) |
| *F16H 1/16* | (2006.01) |
| *B60W 10/08* | (2006.01) |
| *B60W 10/06* | (2006.01) |
| *B60K 6/48* | (2007.10) |
| *F16H 3/72* | (2006.01) |

(Continued)

(52) U.S. Cl.
CPC . *B60K 6/365* (2013.01); *B60K 6/36* (2013.01); *B60K 6/48* (2013.01); *B60W 10/06* (2013.01); *B60W 10/08* (2013.01); *B60W 20/00* (2013.01); *F16H 1/16* (2013.01); *F16H 3/76* (2013.01); *F16H 3/724* (2013.01); *F16H 2037/104* (2013.01); *Y02T 10/6221* (2013.01); *Y10S 903/902* (2013.01); *Y10S 903/91* (2013.01); *Y10S 903/918* (2013.01)

(58) Field of Classification Search
CPC ....... B60K 6/365; B60K 6/539; B60W 10/08; B60W 20/00; Y10S 903/91; Y10S 903/911; F16H 1/16; F16H 2037/104; F16H 3/76
See application file for complete search history.

(56) References Cited

U.S. PATENT DOCUMENTS

| | | |
|---|---|---|
| 1,074,096 A | 9/1913 | Hammer |
| 1,077,454 A | 11/1913 | Cooke |
| 1,498,840 A | 6/1924 | Hasselbring, Jr. |

(Continued)

FOREIGN PATENT DOCUMENTS

| | | |
|---|---|---|
| CN | 100520124 C | 7/2009 |
| CN | 102369374 A | 3/2012 |

(Continued)

OTHER PUBLICATIONS

International Search Report of International Application No. PCT/US13/22633 mailed Apr. 12, 2013.

(Continued)

*Primary Examiner* — Mussa A Shaawat
*Assistant Examiner* — Thomas Ingram
(74) *Attorney, Agent, or Firm* — Gardere Wynne Sewell LLP

(57) ABSTRACT

An exemplary infinitely variable transmission includes a planetary gear set situated in a drive train of an automotive vehicle and interfaced with a worm gear driven by an electrical motor continuously controlled by an electronic control unit in response to a torque demand. Another aspect may be selection of the worm gear helix angle to effect a balance between worm gear teeth friction and load placed on the worm gear by the planetary gear set, such that power required to drive the worm gear is minimized for all input load conditions.

30 Claims, 15 Drawing Sheets

(51) Int. Cl.
*B60K 6/365* (2007.10)
*F16H 37/10* (2006.01)

(56) References Cited

U.S. PATENT DOCUMENTS

| | | |
|---|---|---|
| 1,601,662 A | 9/1926 | Abbott |
| 1,642,721 A | 9/1927 | Brooke |
| 1,663,158 A | 3/1928 | Dick |
| 1,689,685 A | 10/1928 | Reeves |
| 1,732,247 A | 10/1929 | Tornberg |
| 1,798,722 A | 3/1931 | Chalmers |
| 1,801,355 A | 4/1931 | Lorenz |
| 1,803,422 A | 5/1931 | Blyth |
| 1,807,013 A | 5/1931 | Rayburn |
| 1,807,035 A | 5/1931 | Herman |
| 1,810,282 A | 6/1931 | Ljungstrom |
| 1,817,159 A | 8/1931 | Morison |
| 1,822,805 A | 9/1931 | D'Halloy |
| 1,825,691 A | 10/1931 | Hall |
| 1,839,815 A | 1/1932 | Teece |
| 1,848,413 A | 3/1932 | Bragg et al. |
| 1,857,631 A | 5/1932 | Evans |
| 1,885,880 A | 11/1932 | Wiener |
| 1,887,705 A | 11/1932 | Worrell |
| 1,897,436 A | 2/1933 | Mulder |
| 1,902,245 A | 3/1933 | Kinser |
| 1,904,319 A | 4/1933 | Marolf |
| 1,904,652 A | 4/1933 | Cundall |
| 1,905,300 A | 4/1933 | Mello |
| 1,911,897 A | 5/1933 | Holmes |
| 1,922,887 A | 8/1933 | Ellis et al. |
| 1,935,589 A | 11/1933 | Dodge |
| 1,938,594 A | 12/1933 | Johnson |
| 1,949,078 A | 2/1934 | Kinser |
| 1,951,536 A | 3/1934 | Swift, Jr. |
| 1,953,829 A | 4/1934 | Morris |
| 1,968,030 A | 7/1934 | de Filippis |
| 1,972,175 A | 9/1934 | Vessey |
| 1,978,439 A | 10/1934 | Sharpe |
| 1,979,570 A | 11/1934 | Paterson |
| 1,980,656 A | 11/1934 | Barnett |
| 1,983,916 A | 12/1934 | McGill |
| 1,987,251 A | 1/1935 | Bedford |
| 1,990,786 A | 2/1935 | Horowitz et al. |
| 1,997,608 A | 4/1935 | Swift, Jr. |
| 1,997,961 A | 4/1935 | Beria |
| 2,003,817 A | 6/1935 | Almen |
| 2,006,160 A | 6/1935 | Dodge |
| 2,007,533 A | 7/1935 | Iversen |
| 2,008,734 A | 7/1935 | Weems |
| 2,008,869 A | 7/1935 | Leoni |
| 2,010,355 A | 8/1935 | Ernst et al. |
| 2,011,101 A | 8/1935 | Dodge |
| 2,015,638 A | 9/1935 | Kohn |
| 2,026,928 A | 1/1936 | Back et al. |
| RE19,989 E | 5/1936 | Swift, Jr. |
| 2,045,559 A | 6/1936 | Gove et al. |
| 2,054,165 A | 9/1936 | Nenninger et al. |
| 2,066,758 A | 1/1937 | Bassoff |
| 2,071,785 A | 2/1937 | Ehrlich |
| 2,075,944 A | 4/1937 | Hughes |
| 2,086,889 A | 7/1937 | Anderson, Jr. |
| 2,088,834 A | 8/1937 | Briggs |
| 2,097,283 A | 10/1937 | Kohn |
| 2,101,845 A | 12/1937 | Fraser |
| 2,120,953 A | 6/1938 | Bear |
| RE20,846 E | 9/1938 | Dodge |
| 2,131,158 A | 9/1938 | Almen et al. |
| 2,131,787 A | 10/1938 | Rockwell et al. |
| 2,132,726 A | 10/1938 | Ehrlich |
| 2,148,857 A | 2/1939 | Erban |
| 2,150,456 A | 3/1939 | Perrine |
| 2,162,124 A | 6/1939 | Robin et al. |
| 2,170,930 A | 8/1939 | Paterson |
| 2,181,118 A | 11/1939 | Burner |
| 2,182,458 A | 12/1939 | Vickers |
| 2,183,403 A | 12/1939 | Mitchell |
| 2,186,662 A | 1/1940 | Berger |
| 2,196,064 A | 4/1940 | Erban |
| 2,199,056 A | 4/1940 | Swennes |
| 2,207,073 A | 7/1940 | Shields |
| 2,207,866 A | 7/1940 | Kriek |
| 2,209,254 A | 7/1940 | Ahnger |
| 2,252,034 A | 8/1941 | Renfrew |
| 2,253,701 A | 8/1941 | Grunbaum |
| 2,285,760 A | 6/1942 | Thompson |
| 2,303,026 A | 11/1942 | Croden |
| 2,311,691 A | 2/1943 | Porter |
| 2,332,588 A | 10/1943 | Moffitt |
| 2,341,163 A | 2/1944 | Schjolin |
| 2,355,000 A | 8/1944 | Liebrecht |
| 2,364,919 A | 12/1944 | Ryan |
| 2,403,954 A | 7/1946 | Schjolin |
| 2,432,442 A | 12/1947 | Pourtier |
| 2,592,538 A | 4/1952 | Burtnett |
| 2,605,651 A | 8/1952 | Winther |
| 2,655,056 A | 10/1953 | Clintsman |
| 2,666,492 A | 1/1954 | Nims et al. |
| 2,668,459 A | 2/1954 | Berklege |
| 2,686,432 A | 8/1954 | Bergmann |
| 2,711,105 A | 6/1955 | Williams |
| 2,730,907 A | 1/1956 | Marean |
| 2,734,397 A | 2/1956 | Bade |
| 2,743,621 A | 5/1956 | Beier |
| 2,755,078 A | 7/1956 | Chillson |
| 2,787,920 A | 4/1957 | Blaha |
| 2,791,184 A | 5/1957 | Sturm |
| 2,792,723 A | 5/1957 | Zelewsky |
| 2,804,748 A | 9/1957 | Hutchinson |
| 2,836,994 A | 6/1958 | Weber |
| 2,847,876 A | 8/1958 | Willard |
| 2,868,038 A | 1/1959 | Billeter |
| 2,868,039 A | 1/1959 | Lee |
| 2,878,688 A | 3/1959 | Palmer |
| 2,916,932 A | 12/1959 | Patterson |
| 2,940,337 A | 6/1960 | Kalb |
| 2,951,398 A | 9/1960 | Glomb et al. |
| 2,973,653 A | 3/1961 | Riedl |
| 3,078,739 A | 2/1963 | Weinrich |
| 3,083,801 A | 4/1963 | Frohner |
| 3,220,284 A | 11/1965 | Horvath |
| 3,225,617 A | 12/1965 | Young |
| 3,246,531 A | 4/1966 | Kashihara |
| 3,400,609 A | 9/1968 | Utter |
| 3,427,899 A | 2/1969 | Gunderson et al. |
| 3,442,156 A | 5/1969 | Novinger |
| 3,468,192 A | 9/1969 | Nasvytis |
| 4,109,550 A | 8/1978 | Murayama |
| 4,152,947 A | 5/1979 | van Deursen et al. |
| 4,290,320 A | 9/1981 | Abbott |
| 4,515,040 A | 5/1985 | Takeuchi et al. |
| 4,585,429 A | 4/1986 | Marier |
| 4,599,916 A | 7/1986 | Hirosawa |
| 4,644,820 A | 2/1987 | Macey et al. |
| 4,644,821 A | 2/1987 | Sumiyoshi et al. |
| 4,656,884 A | 4/1987 | Nemoto |
| 4,662,245 A | 5/1987 | Taylor |
| 4,665,773 A | 5/1987 | Hiramatsu et al. |
| 4,819,494 A | 4/1989 | Giuliani et al. |
| 4,836,040 A | 6/1989 | Brems |
| 4,836,049 A | 6/1989 | Moan |
| 4,875,892 A | 10/1989 | Sueda |
| 4,885,955 A | 12/1989 | Kraus |
| 4,973,295 A | 11/1990 | Lee |
| 5,036,716 A | 8/1991 | Daniehl |
| 5,230,258 A | 7/1993 | Nakano |
| 5,334,115 A | 8/1994 | Pires |
| 5,356,347 A | 10/1994 | Komura et al. |
| 5,544,170 A | 8/1996 | Kasahara |
| 5,556,348 A | 9/1996 | Kokubu et al. |
| 5,645,507 A | 7/1997 | Hathaway |
| 5,651,750 A | 7/1997 | Imanishi et al. |
| 5,803,858 A | 9/1998 | Haka |
| 5,846,155 A | 12/1998 | Taniguchi et al. |

(56) References Cited

U.S. PATENT DOCUMENTS

| | | |
|---|---|---|
| 5,984,826 A | 11/1999 | Nakano |
| 5,997,426 A | 12/1999 | Ito et al. |
| 6,063,002 A | 5/2000 | Nobumoto et al. |
| 6,066,070 A | 5/2000 | Ito et al. |
| 6,119,539 A | 9/2000 | Papanicolaou |
| 6,159,126 A | 12/2000 | Oshidari |
| 6,171,210 B1 | 1/2001 | Miyata et al. |
| 6,188,944 B1 | 2/2001 | Kolmanovsky et al. |
| 6,251,039 B1 | 6/2001 | Koga |
| 6,371,878 B1 * | 4/2002 | Bowen ............................... 475/5 |
| 6,461,268 B1 | 10/2002 | Milner |
| 6,527,658 B2 * | 3/2003 | Holmes et al. .................... 475/5 |
| 6,527,671 B2 | 3/2003 | Paalasmaa et al. |
| 6,551,208 B1 | 4/2003 | Holmes et al. |
| 6,575,047 B2 | 6/2003 | Reik et al. |
| 6,837,819 B2 | 1/2005 | Foster |
| 6,945,903 B2 | 9/2005 | Miller |
| 7,056,257 B2 | 6/2006 | Usoro et al. |
| 7,115,066 B1 | 10/2006 | Lee |
| 7,357,747 B2 | 4/2008 | Hamilton |
| 7,611,432 B2 | 11/2009 | Maguire et al. |
| 7,686,149 B2 * | 3/2010 | Sachsenmaier et al. ...... 192/84.6 |
| 9,085,225 B2 | 7/2015 | Halwes |
| 2007/0225113 A1 * | 9/2007 | Ogata ............................... 477/3 |
| 2008/0090690 A1 * | 4/2008 | Lee ............... 475/207 |
| 2008/0182699 A1 * | 7/2008 | Salvaire et al. ............... 475/171 |
| 2009/0270214 A1 * | 10/2009 | Nowak et al. ................. 475/159 |
| 2011/0111903 A1 | 5/2011 | Wenthen |
| 2012/0010794 A1 * | 1/2012 | Sahashi et al. .................. 701/58 |
| 2012/0065017 A1 | 3/2012 | Yamada |

FOREIGN PATENT DOCUMENTS

| | | |
|---|---|---|
| EP | 2436546 A1 | 4/2012 |
| EP | 2754921 A2 | 7/2014 |
| JP | HEI 02-097751 | 4/1990 |
| JP | HEI 09-037411 | 2/1997 |
| JP | 2006-347311 A | 12/2006 |
| WO | WO-2010137087 A1 | 12/2010 |

OTHER PUBLICATIONS

Written Opinion of International Application No. PCT/US13/22633 mailed Apr. 12, 2013.
English translation of notification of reasons for refusal for KR 10-2014-7023560, dated Sep. 2015, 5 pgs.
English translation of office action in JP Patent Application No. 2014-553522, mailed Oct. 6, 2015, 6 pgs.
European Search Report for Co-Pending European Application No. 13740603.9 issued Mar. 16, 2016, 6 pgs.
Machine Translation of JP 2006-347311, dated Dec. 28, 2006, 16 pgs.
Patent Examination Report No. 1 for AU Patent Application No. 2013212362, dated Jun. 22, 2015, 3 pgs.
Supplementary European Search Report in EP Application No. 13740603.9 dated Mar. 16, 2016, 6 pgs.
Office Action dated Apr. 19, 2016 in copending CN App. No. 2013800140763.
English Translation of Office Action dated Apr. 19, 2016 in copending CN App. No. 2013800140763.
English Translation of Abstract of CN100520124C.
English Translation of Abstract of CN102369374A.

\* cited by examiner

INFINITELY VARIABLE TRANSMISSION

CROSS REFERENCE TO RELATED APPLICATIONS

Pursuant to 35 U.S.C. §120, this application is a continuation of, and incorporates by reference for all purposes, U.S. patent application Ser. No. 13/356,425, entitled "INFINITELY VARIABLE TRANSMISSION," filed Jan. 23, 2012, and naming Dennis Ray Halwes as inventor.

TECHNICAL FIELD

The present disclosure relates generally to the field of automotive vehicles and more particularly, but not by way of limitation, to an infinitely variable transmission implemented in automotive vehicles having internal combustion engines.

BACKGROUND

Automotive vehicles typically have a drive train in which an internal combustion engine provides power to wheels, or other motivational mechanisms, through a transmission that provides speed and torque conversions from a rotating drive shaft to the wheels using gear ratios. Typical transmissions have included combinations of planetary gears and clutches that are utilized to fix one set of gears with respect to the other gears to select one of a few predetermined ratios in a stepwise fashion.

More recently, the continuously variable transmission (CVT) has emerged in various forms (e.g., belt drive, pulley drive, etc.) to provide stepless change through an infinite number of effective gear ratios between maximum and minimum values. The flexibility of a CVT allows the driving shaft to maintain a constant angular velocity over a range of output velocities. This constant angular velocity can provide better fuel economy by enabling the engine to run at its most efficient revolutions per minute (RPM) for a range of vehicle speeds. Alternatively it can be used to maximize the performance of a vehicle by allowing the engine to turn at the RPM at which it produces peak power.

A specific type of CVT is the infinitely variable transmission (IVT), in which the range of ratios of output shaft speed to input shaft speed includes a zero ratio that can be continuously approached from a defined "higher" ratio. A zero output speed (low gear) with a finite input speed implies an infinite input-to-output speed ratio, which can be continuously approached from a given finite input value with an IVT. Low gears are a reference to low ratios of output speed to input speed. This low ratio is taken to the extreme with IVTs, resulting in a "neutral", or non-driving "low" gear limit, in which the output speed is zero. Unlike neutral in a normal automotive transmission, IVT output rotation may be prevented because the backdriving (reverse IVT operation) ratio may be infinite, resulting in impossibly high backdriving torque. However, ratcheting IVT output may freely rotate forward.

SUMMARY

According to an exemplary aspect of the present disclosure, an infinitely variable transmission includes a planetary gear set situated in a drive train of an automotive vehicle and interfaced with a worm gear driven by an electrical motor continuously controlled by an electronic control unit in response to a torque demand.

One technical aspect of the exemplary control head may be connection of a planetary carrier of the planetary gear set to an output shaft, connection of a sun gear of the planetary gear set to a drive shaft, and interfacing of a ring gear of the planetary gear set with the worm gear.

Another aspect may be selection of the worm gear helix angle to effect a balance between worm gear teeth friction and load placed on the worm gear by the planetary gear set, such that power required to drive the worm gear is minimized for all input load conditions.

Another aspect may include the electronic control unit making a determination whether the torque demand can be satisfied by operating the internal combustion engine at an optimum efficiency set point, and conditioned on results of the determination, either operating the internal combustion engine at the optimum efficiency set point, while modifying the angular velocity of the electrical motor to satisfy the torque demand; or operating the internal combustion engine in a manner that deviates from optimal efficiency only to an extent necessary to satisfy the torque demand.

Other technical advantages may be readily apparent to one skilled in the art after review of the following figures and description associated herewith.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts, in which.

DETAILED DESCRIPTION

It should be understood at the outset that although exemplary implementations of the teachings of the present disclosure are illustrated below, the teachings of the present disclosure may be implemented using any number of techniques, whether currently known or in existence. The present invention should in no way be limited to the exemplary implementations, options, drawings, and techniques illustrated below, including the exemplary design and implementation illustrated and described herein. Additionally, the drawings contained herein are not necessarily drawn to scale.

Figure 1:
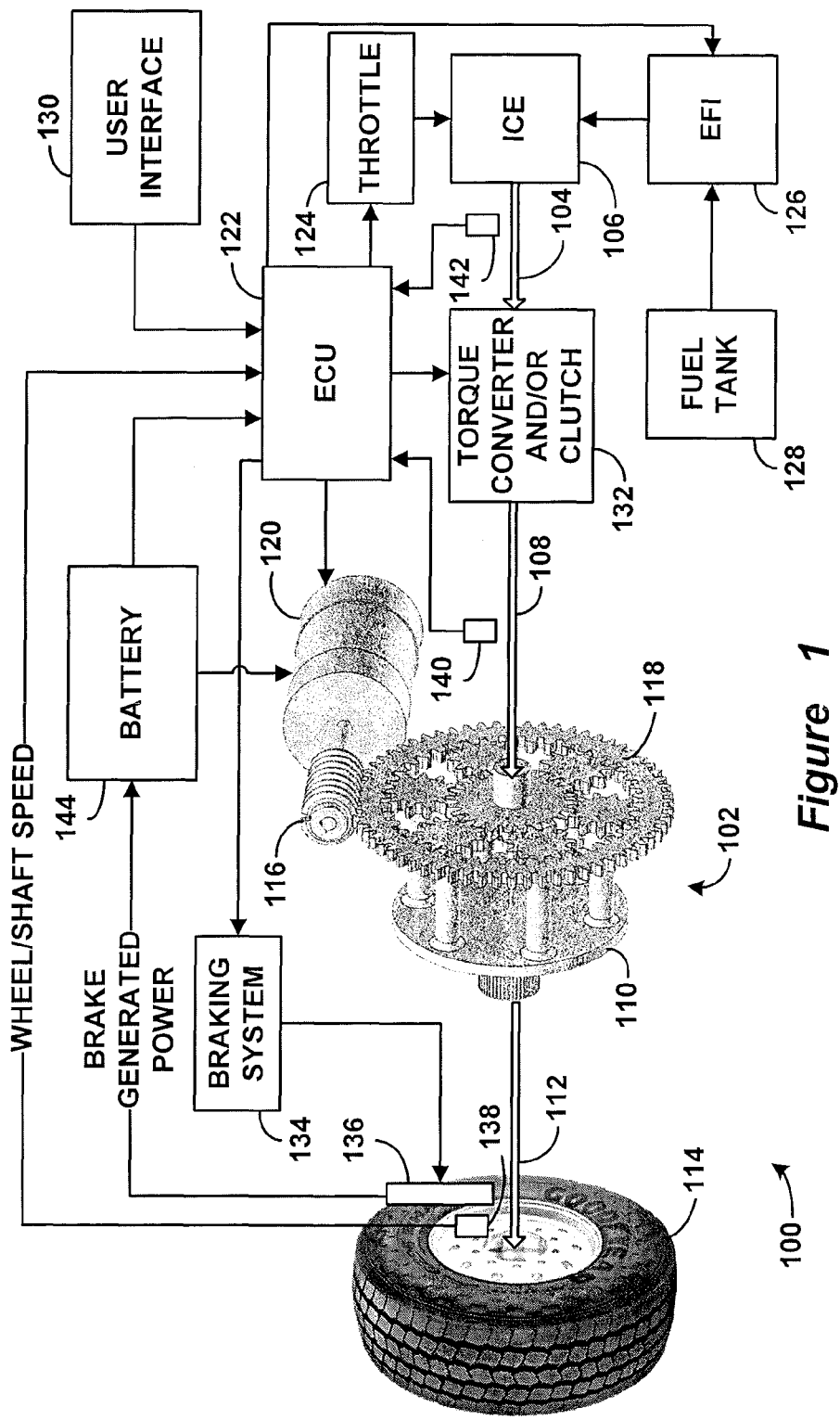
FIG. 1 is a functional block diagram illustrating an embodiment of an automotive vehicle implementing an infinitely variable transmission in accordance with the teachings of the present disclosure.

Referring to FIG. 1, an infinitely variable transmission according to the teachings of the present disclosure can be implemented in an automotive vehicle 100 in part by situation of a planetary gear set 102 in a drive train of the automotive vehicle 100. The planetary gear set 102 can have exactly two input components and an output component, and a drive shaft 104 driven by an internal combustion engine (ICE) 106 of the automotive vehicle 100 can be connected to a drive shaft input component 108 of the two input components. The output component 110 can be connected to an output shaft 112 configured to drive a motivational mechanism 114 (e.g., wheel, track, propeller, rotary wing, etc.) of the automotive vehicle 100. A worm gear 116 can be interfaced with a worm gear input component 118 that is the other of the two input components of the planetary gear set 102. An electrical motor 120 can be connected to drive the worm gear under continuous control of an electronic control unit (ECU) 122 that can also be responsible for continuous control of a throttle 124 of ICE 106 and/or electronic fuel injectors 126 that supply fuel 128 to ICE 106. ECU 122 can be connected to continuously control the electrical motor 120 and ICE 106 in a manner formulated to satisfy a torque demand (e.g., accelerator pedal signal) received from user interface 130, and generated by an operator of the automotive vehicle 100.

It should be understood that ECU 122 can be comprised of one or more computer processors having volatile and/or non-volatile computer memory (e.g., RAM, ROM, FLASH, bit registers, etc.). Additionally, ECU 122 can be a single integrated computer processor unit, or it can composed of multiple processors either co-located or distributed. ECU 122 can also have additional functionalities, such as control of a clutch 132 connecting and disconnecting drive shaft 104 to and from drive shaft input component 108. It is envisioned that such a clutch 132 can be a mechanical clutch, or it can be part of a torque converter. ECU 122 can additionally be responsible for control of braking system 134 to apply a brake 136 to motivational mechanism 114 and/or output shaft 112 in response to a brake pedal signal from user interface 130. It is further envisioned that control of ICE 106 and/or electrical motor 120 by ECU 122 can be conditioned on additional signals received by ECU 122, such as angular velocity of motivational mechanism 114 and/or output shaft 112 from sensor 138. Other signals received by ECU 122 can be angular velocity of drive shaft input component 108 from sensor 140, and/or angular velocity of drive shaft 104 from sensor 142. Further signals that ECU 122 can receive and use in the continuous control operations can include temperature, mass air flow, oxygen level, and other such parameters as are ordinarily employed in operating internal combustion engines in automotive vehicles as will be readily apparent to one skilled in the art. It should also be understood that ECU 122, electrical motor 120, and other electronic components of automotive vehicle 100 can receive power from a battery 144 that can be recharged by brake generated power, or by an alternator.

In some embodiments, the automotive vehicle 100 can be a land based vehicle having one or more wheels as motivational mechanism 114, and such vehicles can be configured with front wheel drive, rear wheel drive, or all wheel drive as will be readily apparent to one skilled in the art. However, it should also be understood that, in other embodiments, automotive vehicle 100 can be a boat, an airplane, or any other type of vehicle having an internal combustion engine. Accordingly, motivational mechanism 114 can be a track system, propeller, rotary wing, or any other mechanism used to translate rotational energy from an internal combustion engine into motive power.

It should be readily understood that planetary gear set 102 can have a sun gear, a planetary carrier, and a ring gear, and that these three components can be assigned as the input and output components in any of six combinations in accordance with the teachings of the present disclosure. However, in a particularly preferred embodiment, the planetary carrier of the planetary gear set 102 is employed as the output component 110, the sun gear is employed as the drive shaft input component 108, and the ring gear is employed as the worm gear input component 118. As will be described in more detail below, this configuration offers a negative idle compensation speed with a zero crossing in the forward direction, thus demanding less top speed capability from electrical motor 120 than is demanded by the other five configurations.

This zero crossing in the forward direction makes it easier to implement the infinitely variable transmission with today's electrical motors capable of maximum forward and reverse speeds in the seven-thousand to twelve-thousand RPM range, without requiring significant intervention by speed adjustment mechanisms (i.e. differentials, speed change gear set, etc.) placed in the drive train, and/or up gear arrangements supplied between worm gear 116 and worm gear input component 118. However, it should be readily understood that such mechanisms can be included if desired, and provide any desired ratio to increase or decrease angular velocity of drive shaft 104, output shaft 112, and/or other components of the drive train to accommodate various implementations of the infinitely variable transmission in accordance with the teachings of the present disclosure.

Worm gear 116 preferably has a helix angle selected to effect a balance between worm gear teeth friction and load of the worm gear input component, such that power required to drive worm gear 116 is minimized for all input load conditions. In other words, the helix angle of the worm gear can be selected so that the force of static friction between the teeth of the worm gear 116 and the teeth of the worm gear input component 118 (e.g., ring gear) is just enough to prevent the load on the worm gear input component 118 from turning the worm gear 116. In this case, no power is required to hold the worm gear from turning, and little power is required to overcome the force of static or kinetic friction to cause the worm gear to turn in the desired direction. Also, when the worm gear is turning the worm gear input component 118 (e.g., ring gear) in the same direction that the input load is trying to turn the worm gear input component 118, the friction load assists the electrical motor 120 by reducing the amount of electrical motor power required in resisting the input load. On the other hand, when the worm gear is turning the worm gear input component 118 (e.g., ring gear) in the opposite direction than the input load is trying to turn the worm gear input component 118, the friction load hinders by increasing the amount of electrical motor power required in resisting the input load. Accordingly, providing the zero crossing in the forward direction by the aforementioned preferred implementation proves advantageous in reducing the power required by the electrical motor 120 because the top speed required of the electrical motor 120 lies in the forward direction, which corresponds to the direction in which the friction load is a help instead of a hindrance.

The desired helix angle for the worm gear 116 can be found by experimentally determining the worm gear angle at which the force of friction cancels out the normal component of the axial load from the worm gear input component 118. It is expected that the helix angle of the worm gear 116 required to achieve this condition will vary depending on the ratio of the planetary gear set 102, the materials employed to form the gear set 102, the implementation of the gear set 102 in the drive train, the overall friction of the drive train, and other factors. However, in the case that the ring gear is employed as the worm gear input component 118, it is envisioned that the desired helix angle will provide a worm gear to ring gear ratio in a range of 3:1 to 5:1. Additionally, the lubricity of the oil in the gear set case can be adjusted to provide a compromise between the helix angle needed for the best load balance, and the helix angle needed for the best worm gear 116 to ring gear ratio for achieving the best ratio of input to output. Accordingly, one can implement a helix angle in the aforementioned range that allows operation within the maximum positive and negative RPM capability of the electrical motor 120, and then conduct trials using oils of different lubricity in a case holding the planetary gear set 102. In at least this manner, the desired helix angle can be readily achieved without requiring undue experimentation.

Figure 2:
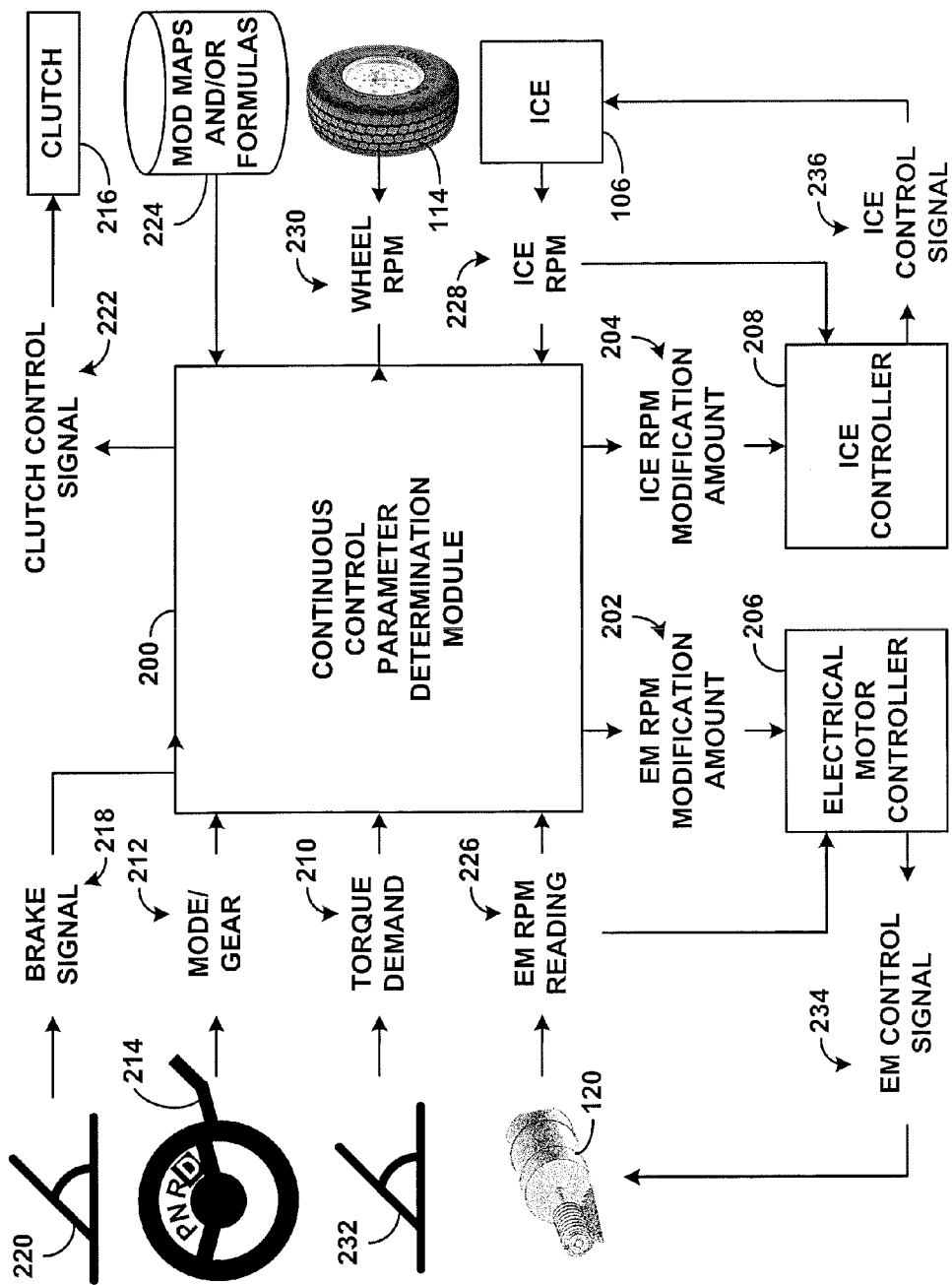
FIG. 2 is a functional block diagram illustrating an embodiment of an electronic control unit of an infinitely variable transmission in accordance with the teachings of the present disclosure.

Turning now to FIG. 2, the ECU of the infinitely variable transmission can be programmed in any number of ways. For example, in some embodiments, the ECU can be configured in a modular format in which a continuous control parameter determination module 200 employs maps and/or formulas to provide modification amounts, such as an electrical motor RPM modification amount 202 and an ICE RPM modification amount 204, to an electrical motor controller 206 and ICE controller 208, respectively. In these and other embodiments, the determination module 200 can be operatively connected to make a determination whether a torque demand 210 can be satisfied by operating the ICE 106 at an optimum efficiency set point for the ICE 106. If so, then the ICE controller 208 can operate the ICE 106 at the optimum efficiency set point, while the electrical motor controller 206 can modify the angular velocity of the electrical motor 120 to satisfy the torque demand 210. Otherwise, the ICE controller 208 can operate the ICE 106 in a manner that deviates from optimal efficiency only to an extent necessary to satisfy the torque demand 210.

In some embodiments, the determination module 200 can vary its operation according to a mode 212 selected by a user. The mode can be selected, for example, in the form of a gear specified using a gear shift mechanism 214 and/or switch. Such modes, described in more detail below, can include a parked and engine off mode, a start mode, a parked and engine on mode, a neutral mode, a reverse mode, and a drive mode. Operation of some of these modes can be dependent on a state of a clutch 216, which can, in some embodiments, be inferred from a state of a brake signal 218 received, for example, from a brake pedal 220 of the vehicle.

Determination module 200 can alternatively or additionally be responsible for generating a clutch control signal 222 to operate clutch 216. In some embodiments, determination module 200 can access a datastore 224 containing formulas and/or operating parameter modification maps. For example, in the case of modification maps, the maps can be accessed based on the mode 212, brake signal 218 or clutch state, electric motor RPM reading 226, ICE RPM reading 228, angular velocity reading 230 of motivational mechanism 114, and/or torque demand 210 received from accelerator pedal 232. It should be readily understood that, in some embodiments, additional sensory data can be employed by determination module 200 to access the datastore 224, such as mass air flow, temperature, oxygen level, and other data typically employed in accessing fuel limit maps in automotive vehicles.

Parameters from a pair of operational parameters retrieved from datastore 224 can be delivered as modification amounts 202 and 204 to controllers 206 and 208, which can then generate control signals 234 and 236 to adjust the RPMs 226 and 228 according to the modification amounts 202 and 204. It should be understood that ICE controller 208 can also receive data, such as ICE RPM 228, temperature, mass air flow, oxygen level, and other parameters normally used in operating internal combustion engines, in order to generate the control signal 236 to achieve the desired result. Thus, ICE controller 208 may have its own lookup maps for supplying fuel and air to ICE 106. Additionally, it should be recognized that while the examples of modes 212 detailed above are useful in a land based automotive vehicle, additional or alternative modes 212 can be used in other types of automotive vehicles.

Figure 3:
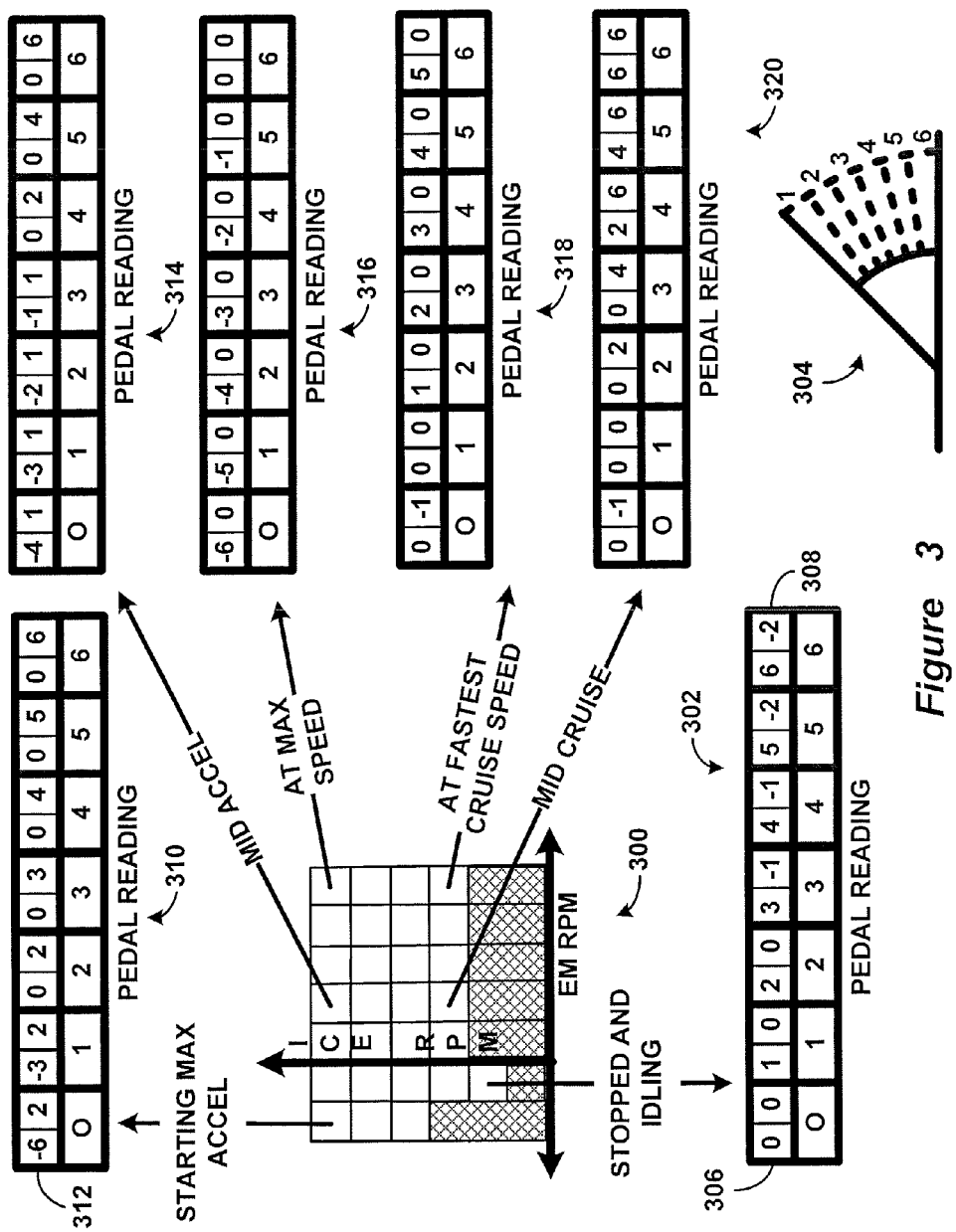
FIG. 3 is a graphical representation of a multi-dimensional map organizing operational parameters formulated in accordance with the teachings of the present disclosure.

Turning now to FIG. 3, a modification map 300 referenced by the determination module to retrieve the operational parameters can be implemented, in some embodiments, as a multi-dimensional matrix. For example, in a simplified embodiment that is reduced in complexity for purposes of illustration, the matrix can be accessed by electrical motor RPM and ICE RPM to arrive at one of plural cells, each containing lists of operational parameter pairs organized by accelerator pedal position value 304. These lists can be constructed with pairs of operational parameters that have been formulated to produce a desired vehicle response to accelerator pedal position under certain operating conditions. For clarity, example parameters are supplied that are greatly simplified in several aspects, one of which is to pair ICE RPMs with RPMs of a ring gear employed as the worm gear interface component in a 5:1 ratio planetary gear set. While it is possible to store ring gear RPMs in the maps, and multiply the parameters by a worm gear to ring gear ratio to arrive at electrical motor RPMs, it is envisioned that storing electrical motor RPMs directly in the maps should result in faster operation by eliminating a needless calculation.

In some embodiments, a stopped and idling list 302 can contain pairs of parameters that are intended for use when the vehicle is stopped, the ICE is idling, and the electrical motor is running at an idle compensation speed. Storing this list 302 in a cell of the matrix that is referenced by electrical motor RPM and ICE RPM values that are both in range for that operating condition allows retrieval of the list 302 by the determination module when the vehicle is operating under those conditions.

Upon retrieval of list 302, an accelerator pedal position value 304 can be used to reference a particular item of that list and retrieve the pair of parameters stored as that item. For example, if the accelerator pedal is in a zero position at which it is not pressed at all, then the pair of parameters (0, 0) can be retrieved from the first list item 306. The first parameter of the pair can be used to indicate an amount or degree of desired increase of ICE RPM, while the second parameter of the pair can be used to indicate an amount or degree of desired increase of electrical motor RPM. In the case when the pedal is not pressed at all, the (0, 0) pair will result in no changes.

If the pedal is fully depressed to a maximum position, referred to herein as the six position for ease of illustration, then the pair of parameters (6, −2) can be retrieved from the last list item 308. Use of the first parameter of that pair to change the ICE RPM can then result in a rapid increase of ICE RPM, while use of the second parameter of that pair to change the electrical motor RPM can result in decrease of the electrical motor RPM to provide increased torque in preparation for rapid acceleration. The parameter pair can be formulated such that the rates of ICE RPM increase and electrical motor RPM decrease are coordinated to result in the vehicle remaining stationary until the maximum ICE RPM and minimum electrical motor RPM conditions are obtained, so that a maximum rate of acceleration can be achieved. Different maps can be employed in forward and reverse modes of operation, and to whatever extent the parameters result in some drift of the vehicle from the stationary condition, that parameters can be formulated to err on the side of forward drift in the forward mode, and to err on the side of reverse drift in the reverse mode. Thusly, holding the accelerator pedal in the six position can rapidly result in change of the RPM values until the vehicle operating condition changes and the determination module shifts to another cell of the matrix and utilizes a different list.

The lists in the cells that will be traversed during the preparation for the maximum acceleration rate operation can be constructed with formulated pairs of parameters that cause a smooth transition from the stopped and idling condition to a stopped and starting max acceleration condition at which a starting max acceleration list 310 can be accessed. This list 310 can be constructed of parameter pairs formulated to accelerate the vehicle from rest while the ICE RPM is at a maximum value by increasing the electrical motor RPM from its minimum value. It can also have a parameter pair (−6, 2) in the list item 312 for the zero pedal position that allows both of the RPMs to begin their return to the stopped and idle condition without accelerating. Other lists in cells that are traversed during this process can have similar pairs of parameters in their zero pedal positions to allow the complete return of the vehicle to the stopped and idle condition from the stopped and starting max acceleration condition. While the pedal is in the zero position, the clutch can be released to prevent any drift, and the operator can additionally apply a brake pedal.

While the ICE RPM is maximized, the determination module can continue to access a top row of the lookup table 300, traversing cells and retrieving lists that progressively transition through mid acceleration list 314 to maximum speed list 316. While utilizing mid acceleration list 314, holding the acceleration pedal in the six position can continue to accelerate at the maximum rate by increasing the electrical motor RPM. However, the zero pedal position can retrieve a pair of parameters from list 314 that permits a deceleration by rapidly decreasing ICE RPM while slowly increasing electrical motor RPM. Additionally, a slightly depressed pedal position, the one position, can decrease the ICE RPM while increasing the electrical motor RPM in a fashion that neither accelerates nor decelerates the vehicle. Also, a slightly more depressed pedal position, the two position, can decrease the ICE RPM while increasing the electrical motor RPM in a fashion that slowly accelerates the vehicle. These parameters are thus formulated to satisfy the torque demand while permitting the vehicle to transition towards a more efficient cruise condition having ICE RPM that is decreased in favor of electrical motor RPM.

Maximum speed list 316 can be retrieved when both ICE RPM and electrical motor RPM are at or near maximum. In this case, the pairs of parameters can be formulated to permit maintenance of the top vehicle speed by continued depression of the accelerator pedal in the six position. A less depressed position, however, can permit decrease of ICE RPM while electrical motor RPM continues to be maximized. Accordingly, quick transition towards the cruise condition can be achieved by decreasing ICE RPM in favor of electrical motor RPM.

When the cruise condition is reached from the maximum speed condition, the vehicle is at a fastest cruise speed condition at which the most efficient ICE RPM has been obtained while at the maximum electrical motor RPM. The fastest cruise speed list 318 can be formulated to permit slow deceleration when the pedal is at the zero position by reduction of electrical motor RPM while ICE RPM is held constant. Cells in the map 300 that lie in a row corresponding to the cruise condition can all contain lists, such as mid cruise list 320, having parameters formulated to permit the efficient ICE RPM set point to be maintained while deceleration, constant speed, and/or slow acceleration are desired. Thus, when acceleration is desired, electrical motor RPM can be increased in favor of ICE RPM, and ICE RPM can be maintained at the efficient set point. However, when fast acceleration is desired, then it can become necessary to increase ICE RPM in order to satisfy the torque request. Also, when the vehicle slows towards the stopped and idle condition, then parameters can be formulated to permit transition back to the stopped and idle condition.

If the combination of ICE RPM and electrical motor RPM leads to a cell of the matrix that is null (i.e., the condition is out of range and no list is defined for that condition) then the processor can take corrective actions. For example, if the vehicle is trying to go uphill, but the electrical motor RPM is too high to provide sufficient torque, then the ICE RPM can fall below the cruise row. In this case, the processor can rapidly decrease electrical motor RPM to provide the torque needed to allow the ICE RPM to rise back into the normal operation range. With the operator pressing the accelerator pedal into or towards the six position to demand more torque, the processor can quickly satisfy a torque demand for rapidly climbing the hill.

The corrective measure described above, as well as other corrective measures, can additionally or alternatively be implemented if the vehicle condition transitions in an unexpected manner or map direction. For example, if the vehicle is in the mid cruise condition, and if the accelerator pedal is in the one position, then the electrical motor RPM and the ICE RPM are expected to remain constant. In this case, if either or both of these values increase to the point that a different cell of the map is unexpectedly referenced, then corrective measures can be taken. For example, if one or both of these RPMs increases unexpectedly, then the vehicle may be presumed to be going downhill In this case, the clutch can be disengaged, wheel RPM can be read, and operational parameters can be retrieved from a map formulated to operate the electrical motor at an angular velocity that matches the angular velocity of the drive shaft input component (e.g., sun gear) to the angular velocity of the drive shaft. Thus, an overdrive capability can be implemented that allows the vehicle to coast downhill and gain speed while preparing the drive shaft input component to engage rapidly with the drive shaft upon increased torque demand. In some embodiments, this operation can adjust electrical motor RPM while maintaining ICE RPM at an optimum efficiency set point, if possible, and only increase ICE RPM above the set point as required to prepare for a high speed condition.

For the embodiments that attempt to observe a most efficient ICE operation set point, it should be understood that, in some cases, the most efficient set point for operation of the ICE can vary with conditions such as temperature, mass air flow, air pressure, oxygen level, etc. Accordingly, multiple maps can be provided that are formulated for use during different combinations of these conditions. Thus, the maps employed by the ECU can be matrices of many dimensions, and they can be accessed by various types of parameters such as these.

It is envisioned that additional or alternative embodiments can utilize formulas and/or fuzzy logic routines to determine dynamically the parameters for controlling the ICE and the electrical motor to satisfy the torque demand in the manners described herein. For example, a processor can seek to satisfy a vehicle speed set point or target speed by dynamically determining sets of parameters for controlling the electrical motor RPM while maintaining the ICE RPM at a maximum efficiency set point. This type of calculation can be useful during a cruise control operation. However, lookup maps are presently preferred for faster operation. It should be understood that a formula can be employed to populate maps of parameters to be used during a cruise control operation. It should also be understood that formulas can be also be used to populate the contents of the lookup maps under any of the assumed conditions.

The following equation provides a general form for predicting the behavior of a planetary gear set employed in an infinitely variable transmission in accordance with the teachings of the present invention:

$$(N_{sun} * \omega_{sun}) + (N_{ring} * \omega_{ring}) = (N_{sun} + N_{ring}) * \omega_{arm}$$

where Nsun is the number of teeth of the sun gear, Nring is the number of teeth of the ring gear, ωsun is the angular velocity of the sun gear, ωring is the angular velocity of the ring gear, and ωarm is the angular velocity of the planetary carrier. Accordingly, with a ring gear to sun gear ratio known, equations can be determined for any assignment of the sun gear, ring gear, and planetary gear to the drive shaft, worm gear, and output shaft. Such equations can then be used to assist in determining the pairs of parameters to employ in the maps for different desired vehicle behaviors in different situations. Such parameters can then be honed experimentally, but without undue experimentation.

Figure 4:
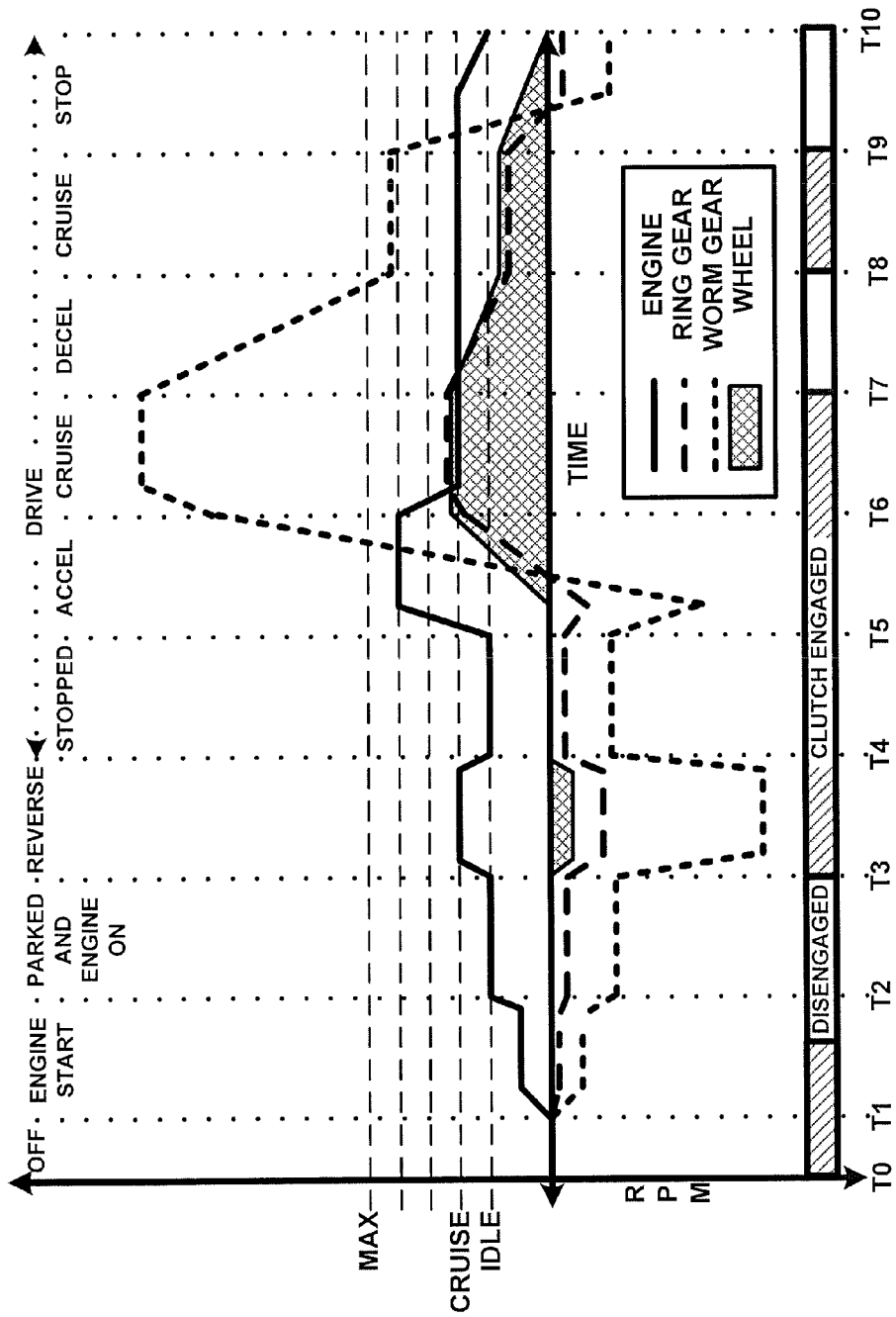
FIG. 4 is a graphical representation of an embodiment of continuously controlled infinitely variable transmission components in accordance with the teachings of the present disclosure.

Turning now to FIG. 4, an example of operation of an automotive land vehicle having rear wheel drive and utilizing the infinitely variable transmission provides further clarifications by way of illustration. For this example, it should be readily understood that the operations are greatly simplified for ease of illustration, and assumptions are made regarding the implementation to permit a cohesive explanation. For example, it is assumed that a planetary gear set is being employed that has the ring gear interfaced with the worm gear, the drive shaft connected to the sun gear by a clutch, and the planetary carrier connected to the output shaft. Additional assumptions include a 4:1 ratio of worm gear to ring gear, a 1:1 rear differential, and a total wheel radius (including tire) of 13 inches. A further assumption is a 5:1 planetary gear ratio, in which case the angular velocity of the ring gear ωring can be determined from the angular velocity of the planetary carrier ωarm and the angular velocity of the sun gear ωsun as follows:

$$\omega_{ring} = (5\,\omega_{arm} - \omega_{sun})/4$$

Yet further assumptions are that the ICE has a max speed of 3000 PRM, a cruise speed of optimal efficiency at 1500 PRM, and an idle speed of 1000 PRM.

The example scenario is for a vehicle that begins at T0 with the engine off, goes through an engine start mode between T1 and T2, is parked with engine on from T2 to T3, and operates in reverse at 15 mph from T3 to T4. The example next has the vehicle operating in a drive mode from T4 to T10. During the drive mode, the vehicle is stopped from T4 to T5, accelerates at a high rate of acceleration to a speed of 60 mph from T5 to T6, and cruises at constant speed of 60 mph from T6 to T7. The vehicle then decelerates while the operator applies the brake from T7 to T8, cruises at a reduced speed of 30 mph from T8 to T9, and then decelerates while the user applies the brake until the vehicle stops from T9 to T10.

The wheel RPM corresponds to the angular velocity of the planetary carrier, while the angular velocity of the sun gear corresponds to the engine RPM. Using the equation provided above, the angular velocity required of the ring gear can be determined. Assuming a 4:1 worm gear to ring gear ratio, the angular velocity of the worm gear and electrical motor can be determined as well. These values are provided below in Table 1:

TABLE 1

| | Wheel RPM | Arm RPM | Engine RPM | Sun RPM | Ring RPM | 4:1 Worm RPM |
|---|---|---|---|---|---|---|
| Start | zero | zero | 500 | 500 | −125 | −500 |
| Idle at Stop | zero | zero | 1000 | 1000 | −250 | −1000 |
| Reverse −15 MPH | −412.5 | −412.5 | 1500 | 1500 | −890.6 | −3562.4 |
| Start Accel | zero | zero | 2500 | 2500 | −625 | −2500 |
| End Accel 60 MPH | 1650 | 1650 | 2500 | 2500 | 1437.5 | 5750 |
| Forward Cruise 60 MPH | 1650 | 1650 | 1500 | 1500 | 1687.5 | 6750 |
| Decel Cruise 30 MPH | 825 | 825 | 1500 | 1500 | 656.3 | 2652.2 |
| Coast Mid 15 MPH | 412.5 | 412.5 | 1500 | 1500 | 140.6 | 562.4 |

Figure 5:
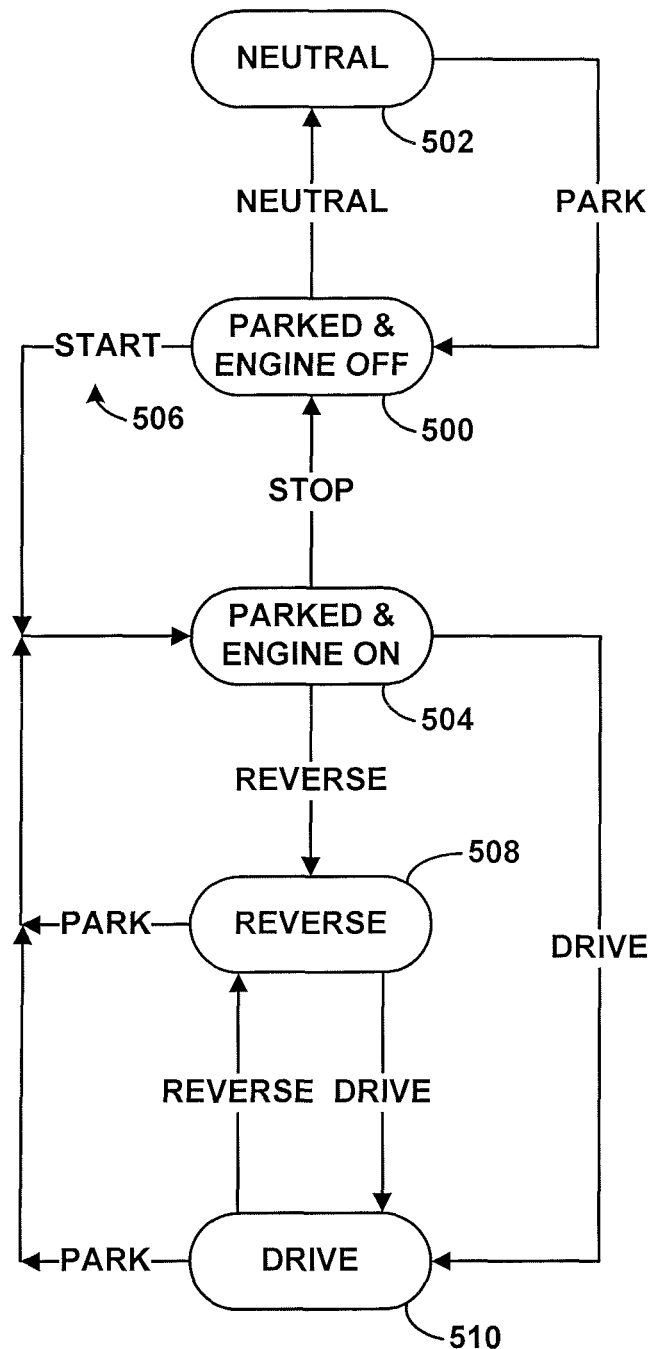
FIG. 5 is a flow diagram illustrating an embodiment of a multi-modal method of operation for use with an infinitely variable transmission in accordance with the teachings of the present disclosure.

Turning to FIG. 5, these modes of operation are explored in more detail. It should be appreciated that the vehicle can transition between a parked and engine off mode 500 and a neutral mode 502 in a straight forward manner that should be readily understood. The vehicle can transition from the parked and engine off mode to the parked and engine on mode 504 by carrying out a start process 506.

Figure 6:
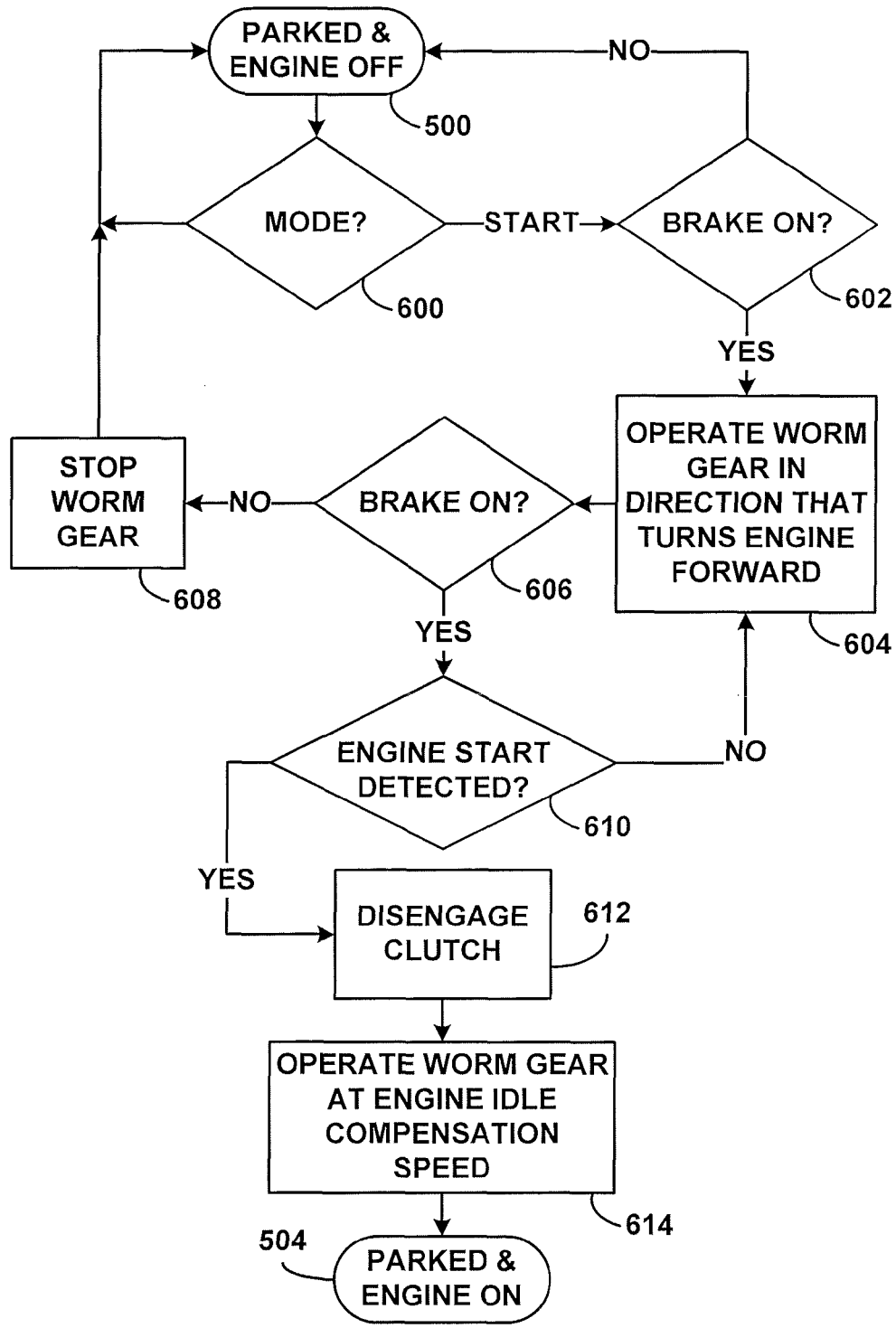
FIG. 6 is a flow diagram illustrating an embodiment of a start mode of a method of operation for use with an infinitely variable transmission in accordance with the teachings of the present disclosure.

Turning to FIGS. 4 and 6 and referring generally thereto, the vehicle remains in the parked and engine off mode 500 until the start switch is actuated at 600 and the brake is on at 602. Then, with the clutch engaged, the worm gear is operated in a direction that turns the engine forward at step 604. The parameter or parameters for operating the worm gear at this speed can be stored in a map specially formulated for operating the electrical motor during the ICE start procedure.

In the example of FIG. 4, the worm gear RPM is driven negative between T1 and T2 while the brake holds the planetary carrier stationary to turn the motor in the forward direction. If the brake is let off during this process at 606, then the worm gear is stopped at 608 and the parked and engine off mode is resumed. Otherwise, the worm gear continues to turn at step 604 until an engine start is detected at 610. Then, the clutch is disengaged at step 612, and the worm gear is driven to an idle compensation speed at step 614. In the example of FIG. 4, this idle compensation speed is even more negative than the speed used to start the motor. At this stage, the vehicle arrives at the parked and engine on mode with the clutch disengaged, but it should be understood that that, with the idle compensation speed maintained, the vehicle would remain stationary even with the clutch engaged. Thus, in some embodiments, the clutch can reengage once the idle compensation speed is achieved.

Returning to FIG. 5, the vehicle can transition from the parked and engine on state 504 to the parked and engine off state 500 by deactivation of the ignition. Alternatively, the vehicle can enter a reverse mode 508 and/or a drive mode 510 from the parked and engine on mode 504, and return to the parked and engine on mode 504 from either of these two modes if the vehicle is stationary. In some embodiments, if the vehicle is stationary, then the vehicle can also transition between the reverse mode 508 and the drive mode 510.

Figure 7:
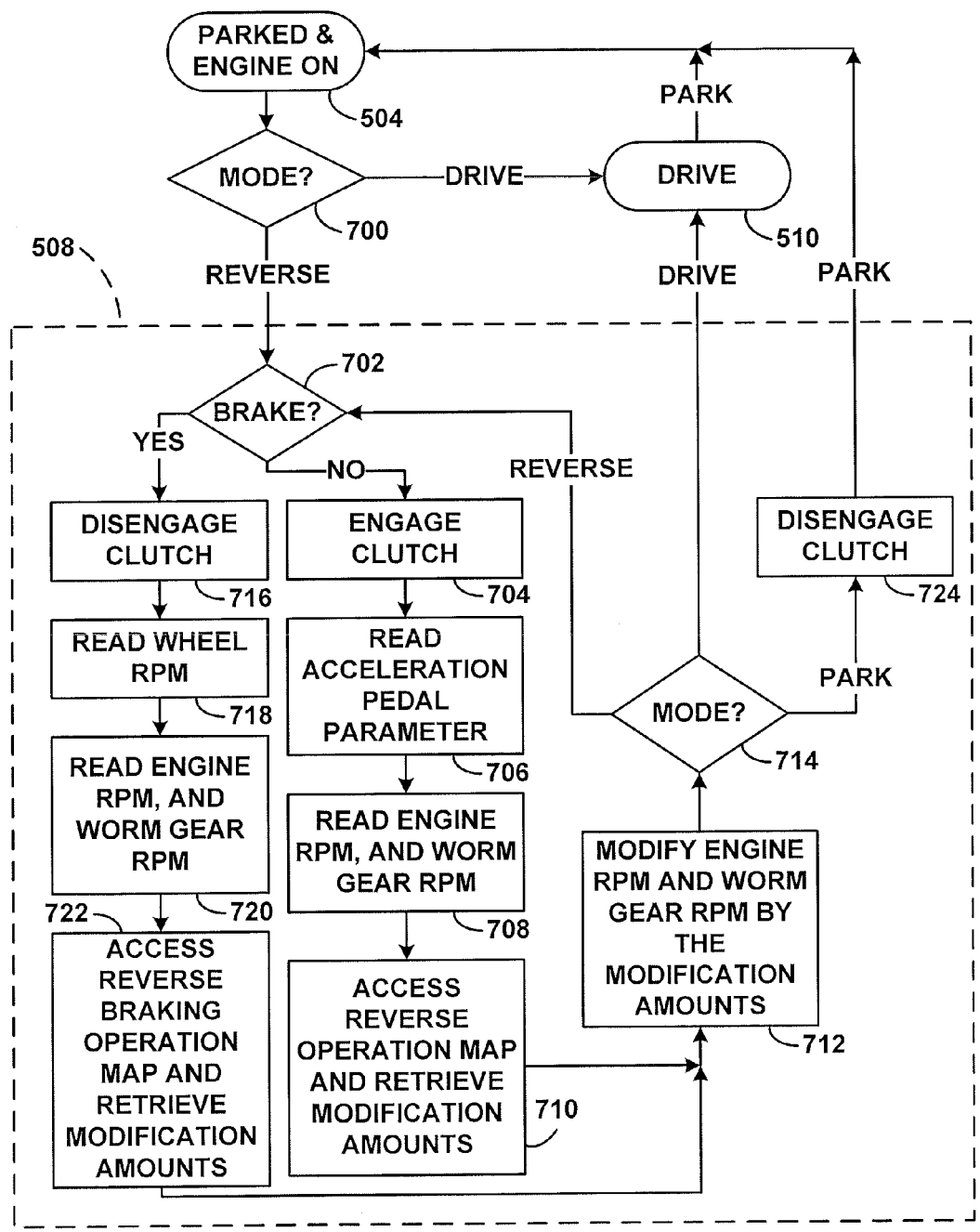
FIG. 7 is a flow diagram illustrating an embodiment of a reverse mode of a method of operation for use with an infinitely variable transmission in accordance with the teachings of the present disclosure.

Turning now to FIGS. 4 and 7 and referring generally thereto, the vehicle can transition from the parked and engine on mode 504 to the reverse mode 508 when a reverse gear is selected at 700. Then, if the brake is not applied at 702, then, the clutch can be engaged if it is not already engaged at step 704, and the acceleration pedal parameter can be read at step 706. Next, engine RPM and worm gear RPM can be determined at step 708, and operational parameters can be retrieved at step 710 from a map of parameter pairs formulated for reverse vehicle operation. These parameters can then be applied at step 712 in the manner described above, and if the reverse mode is not deselected at 714, then operation can return to 702.

Accordingly, as the processor iteratively loops through steps 702-714, operational parameters can be applied to continuously control the electrical motor and the ICE to operate the vehicle in a reverse direction as between T3 and T4 of FIG. 4. If, however, the brake is applied at 702, then the clutch can be disengaged at step 716, wheel RPM can be read at step 718, engine RPM and worm gear RPM can be optionally read at step 720, and operational parameters can be retrieved at step 722 from a map formulated to operate the electrical motor when applied at step 712 at an angular velocity that matches the angular velocity of the drive shaft input component (e.g., sun gear) to the angular velocity of the drive shaft. Disengaging the clutch at step 716 allows for braking without placing undue stress on the transmission, clutch, or ICE, while matching the sun gear RPM to the drive shaft RPM allows for rapid response once the braking operation is completed. The reverse mode can be exited at 714 if the vehicle is stationary and the operator selects a drive gear or a park mode. If the park mode is selected, then the clutch can be disengaged at step 724, if desired, resulting in return to parked and engine on mode 504.

Figure 8:
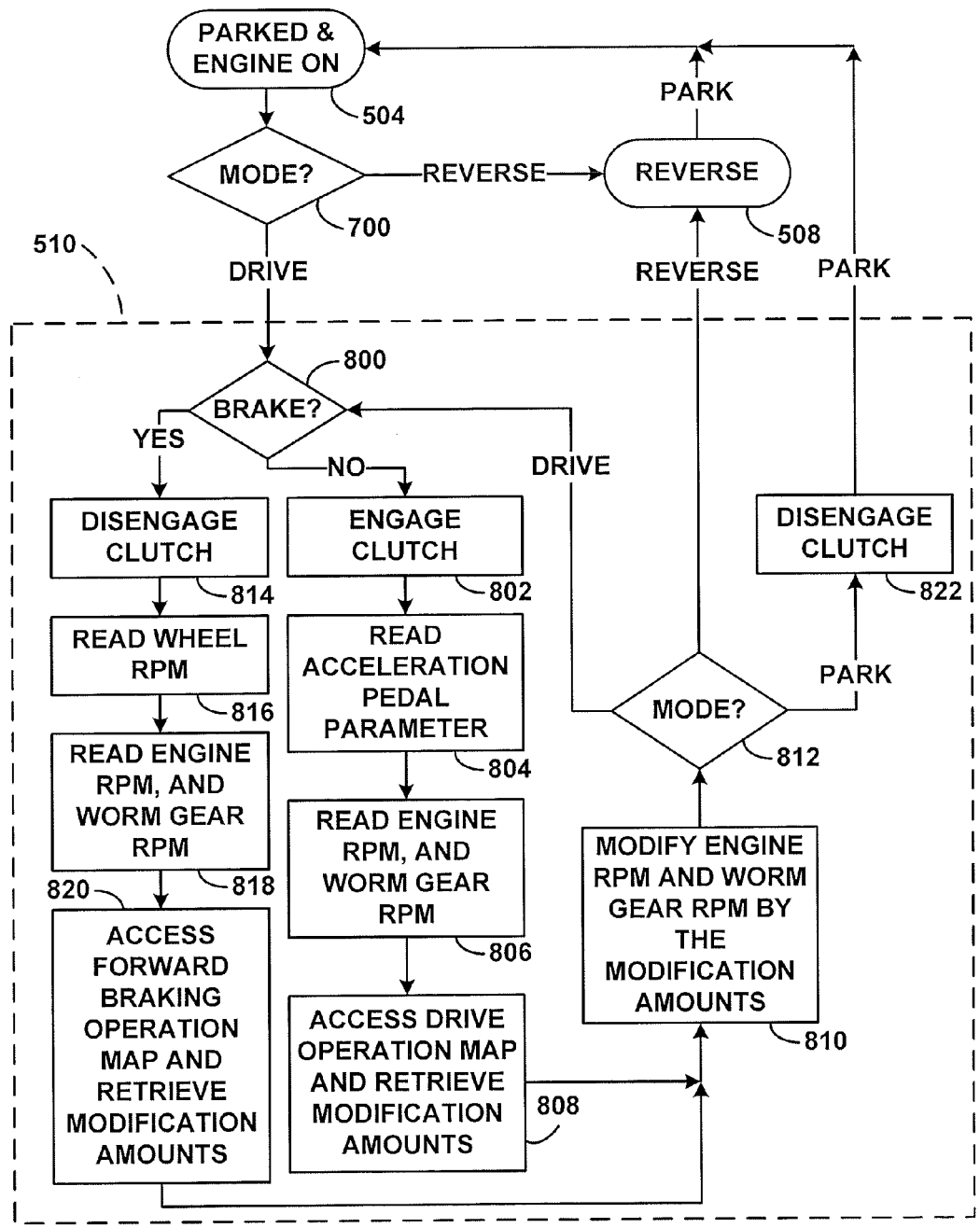
FIG. 8 is a flow diagram illustrating an embodiment of a drive mode of a method of operation for use with an infinitely variable transmission in accordance with the teachings of the present disclosure.

Turning now to FIGS. 4 and 8 and referring generally thereto, selection by a driver at 700 of the drive mode 510 instead of reverse mode 508 can cause the vehicle to transition from the parked and engine on mode 504 to the drive mode 510. Steps 800-810 can be similar to steps 702-712, with a primary difference being the use at step 808 of a map of operational parameters formulated to result in forward motion of the vehicle. For example, if the brake is not applied at 800, then the clutch can be engaged if it is not already engaged at step 802, and the acceleration pedal parameter can be read at step 804. Next, engine RPM and worm gear RPM can be determined at step 806, and operational parameters can be retrieved at step 808 from a map of parameter pairs formulated for forward vehicle operation. These parameters can then be applied at step 810 in the manner described above. Then, if the drive mode is not deselected at 812, then operation can return to 800.

Accordingly, as the processor iteratively loops through steps 800-812, operational parameters can be applied to continuously control the electrical motor and the ICE to operate the vehicle in a forward direction as between T5 and T7 and between T8 and T9 of FIG. 4. If, however, the brake is applied at 800, then the clutch can be disengaged at step 814, wheel RPM can be read at step 816, engine RPM and worm gear RPM can be optionally read at step 818, and operational parameters can be retrieved at step 820 from a map formulated to operate the electrical motor when applied at step 810 at an angular velocity that matches the angular velocity of the drive shaft input component (e.g., sun gear) to the angular velocity of the drive shaft.

Disengaging the clutch at step 814 allows for braking without placing undue stress on the transmission, clutch, or ICE, while matching the sun gear RPM to the drive shaft RPM allows for rapid response once the braking operation is completed. Thus, the vehicle operator can apply the brake and decelerate rapidly, as between T7 and T8 of FIG. 4, and then resume a cruise operation or acceleration operation at the reduced speed without hesitation. Additionally, the operator can brake to a stop, as between T9 and T10 of FIG. 4, where the example illustrates retrieval and application of parameters formulated for a transition from a cruise condition to a stopped and engine idling condition.

As illustrated, these parameters decrease electrical motor RPM in favor of ICE RPM parameters until the electrical motor RPM has reached the idle compensation speed, and then decrease the ICE RPM below the optimum efficiency set point to the ICE idle speed. It should be understood that this formulation of parameters is merely exemplary, and that other formulations may be used, such as formulations that maintain the ICE RPM at the optimum efficiency set point while decreasing the electrical motor RPM below the idle compensation speed, returning to the stopped and engine idling state only after the vehicle is stationary. With the vehicle stationary, the drive mode can be exited at 812 if the operator selects a reverse gear or a park mode. If the park mode is selected, then the clutch can be disengaged at step 822, if desired, resulting in return to parked and engine on mode 504.

Figure 9:
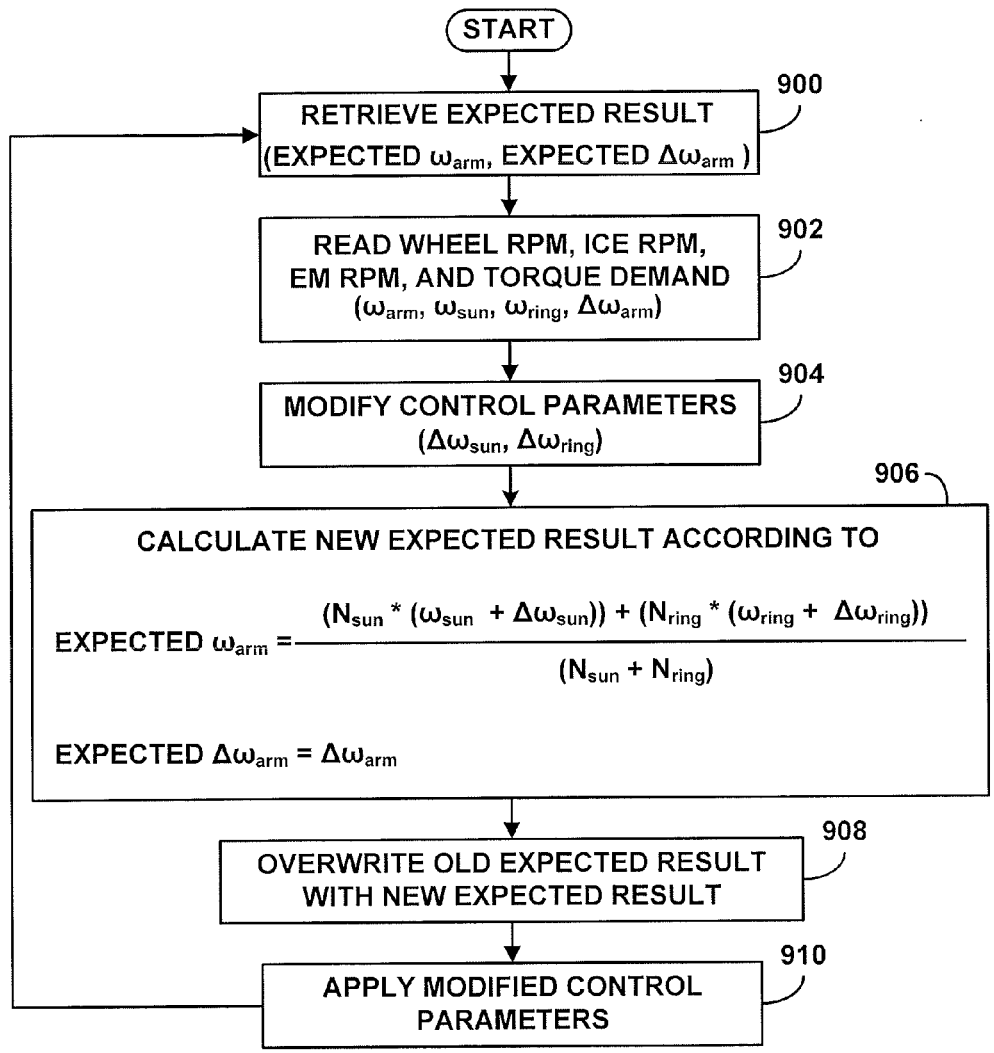
FIG. 9 is a flow diagram illustrating an alternative embodiment of a control process whereby an electronic control unit employs formulas to determine and apply the modified control parameters.

Turning now to FIGS. 9-16, an alternative embodiment is described in which the determination module employs one or more formulas to effect continuous feedback control. Referring particularly to FIG. 9, the control process can begin, for example, at step 900 with the computer processor retrieving expected results from computer memory. The stored expected results can be in the form of an expected angular velocity of the arm (e.g., vehicle speed), and an expected change in the angular velocity of the arm (e.g., previously desired amount of acceleration). The control process can additionally begin by reading sensed values at step 902, such as wheel RPM (e.g., vehicle speed and/or angular velocity of the arm) RPM of the internal combustion engine (e.g., angular velocity of the sun gear), electric motor RPM (e.g., angular velocity of the ring gear), and the current drive demand (e.g., accelerator pedal position, desired change in angular velocity of the arm, desired rate of vehicle acceleration, etc.). Thereafter, the control parameters can be modified using one or more formulae at step 904, which can include determining a change in the internal combustion engine RPM (e.g., angular velocity of the sun gear) and/or a change in the electric motor RPM (e.g., angular velocity of the ring gear). From these data, new expected results can be calculated at step 906 by employing one or more formulae to determine, for example, future expected angular velocity of the arm, and an expected change in the angular velocity of the arm as follows:

$$\text{EXPECTED } \omega_{arm} = \frac{(N_{sun} * (\omega_{sun} + \Delta\omega_{sun})) + (N_{ring} * (\omega_{ring} + \Delta\omega_{ring}))}{(N_{sun} + N_{ring})}$$

$$\text{EXPECTED } \Delta\omega_{arm} = \Delta\omega_{arm}$$

These results can be stored in computer memory at step 908, and the modified control parameters applied at step 910 to control the internal combustion engine and the electric motor.

Figure 10:
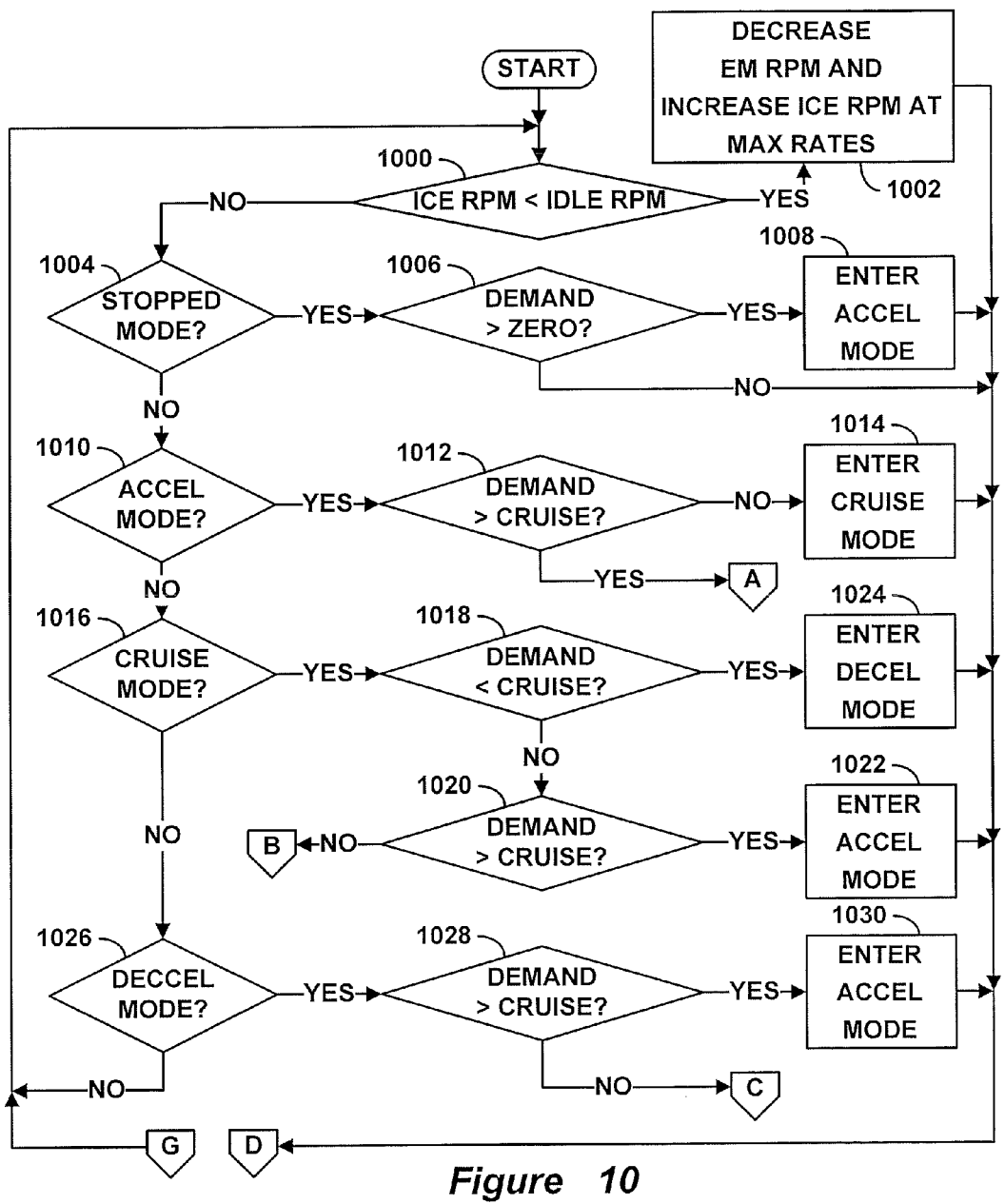
FIG. 10 is a flow diagram illustrating a portion of the process of employing formulas to modify the control parameters in accordance with the alternative embodiment.

Referring now to FIGS. 10-16, an example process for modifying control parameters using one or more formulae during a drive mode of operation is described in detail. Referring particularly to FIG. 10, the process can include determining at step 1000 whether the RPM of the internal combustion engine is less than the minimum expected idle RPM, which can indicate that the motor is in danger of chocking down. If so, emergency measures can be taken at step 1002, for example, by decreasing electric motor RPM and increasing ICE RPM at their maximum rates. Otherwise, the process can proceed to determination at step 1004 whether a stopped mode flag is set. If so, then a further determination can be made at step 1006 whether a drive demand for acceleration is greater than zero. If so, then an acceleration mode flag can be set at step 1008. Otherwise, the control parameters can be unmodified to permit idling at a stop to continue.

Determination at step 1010 that the acceleration mode flag is set, followed by determination at step 1012 that the drive demand for acceleration is greater than a cruise value for maintaining a current speed, can lead to entry to an acceleration operation process described below (see FIG. 11 and FIG. 12). Otherwise, a cruise mode flag can be set at step 1014.

Determination at step 1016 that the cruise mode flag is set, followed by determinations at steps 1018 and 1020 that the drive demand for acceleration is neither greater than nor less than the cruise value for maintaining the current speed, can lead to entry to cruise operation process described below (see FIG. 13). Otherwise, in the event that the drive demand proved greater than the cruise value at step 1020, the acceleration mode flag can be set at step 1022. Alternatively, if the drive demand proved less than the cruise value at step 1018, a deceleration mode flag can be set at step 1024.

Determination at step 1026 that the deceleration mode flag is set, followed by determination at step 1028 that the drive demand for acceleration is greater than the cruise value for maintaining the current speed, can lead to entry to an deceleration operation process described below (see FIG. 14). Otherwise, the acceleration mode flag can be set at step 1030.

Figure 11:
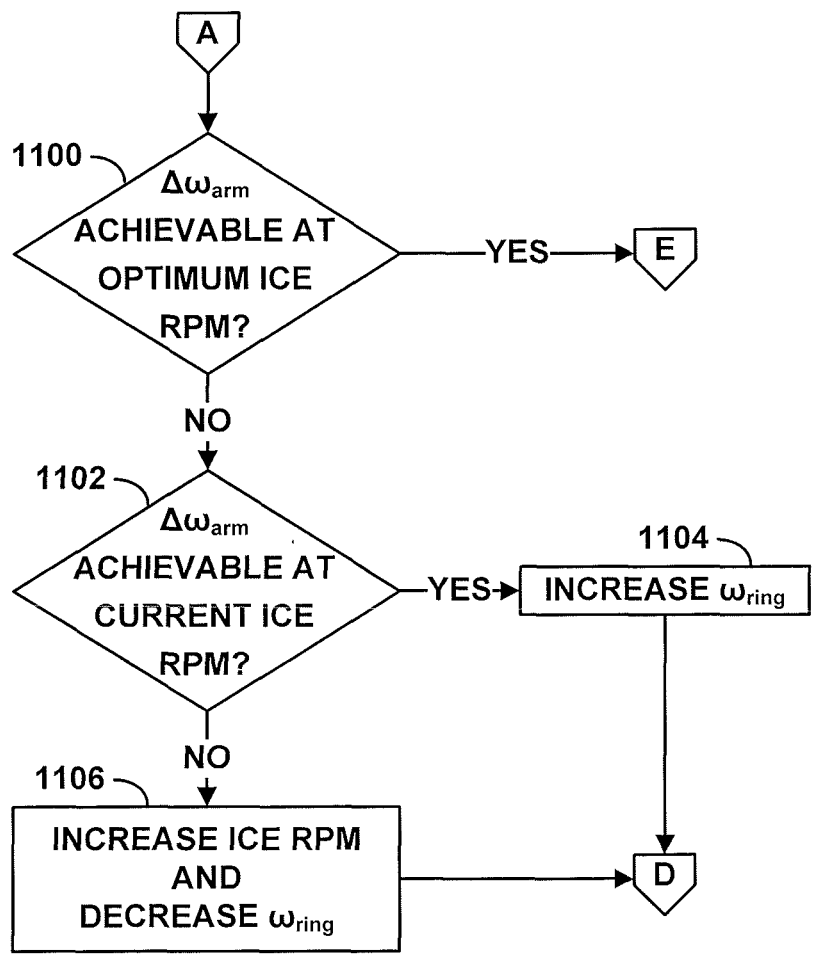
FIG. 11 is a flow diagram illustrating another portion of the process of employing formulas to modify the control parameters during an acceleration mode in which the acceleration cannot be achieved at the optimum ICE RPM set point.

Turning now to FIG. 11, an example acceleration operation process can begin with determination at step 1100 whether a desired rate of acceleration can be achieved at the optimum internal combustion engine RPM set point. In one embodiment, this decision can involve comparing the desired rate of acceleration to a threshold. In some embodiments, this threshold can vary with ambient conditions. In additional or alternative embodiments, the threshold can vary based on information regarding whether the vehicle is travelling uphill or downhill as can be determined in a process described below (see FIG. 14 and FIG. 15).

If it is determined at step 1100 that the desired rate of acceleration cannot be achieved at the optimum internal combustion engine RPM set point, then a further determination can be made at step 1102 whether the desired rate of acceleration can be achieved at the current internal combustion engine RPM. In some embodiment, this decision can involve comparing the desired rate of acceleration to a threshold that can vary according to the current internal combustion engine RPM, ambient conditions, and/or based on information regarding whether the vehicle is travelling uphill or downhill If so, then acceleration can be effected at step 1104 by increasing electric motor RPM to increase angular velocity of the ring gear. If not, then preparations for acceleration can be made at step 1106 by increasing the RPM of the internal combustion engine, and decreasing the electric motor RPM to decrease angular velocity of the ring gear. On the other hand, if it is determined at step 1100 that the desired rate of acceleration can be achieved at the optimum internal combustion engine set point, then a process can be engaged for operating at the optimum set point.

Figure 12:
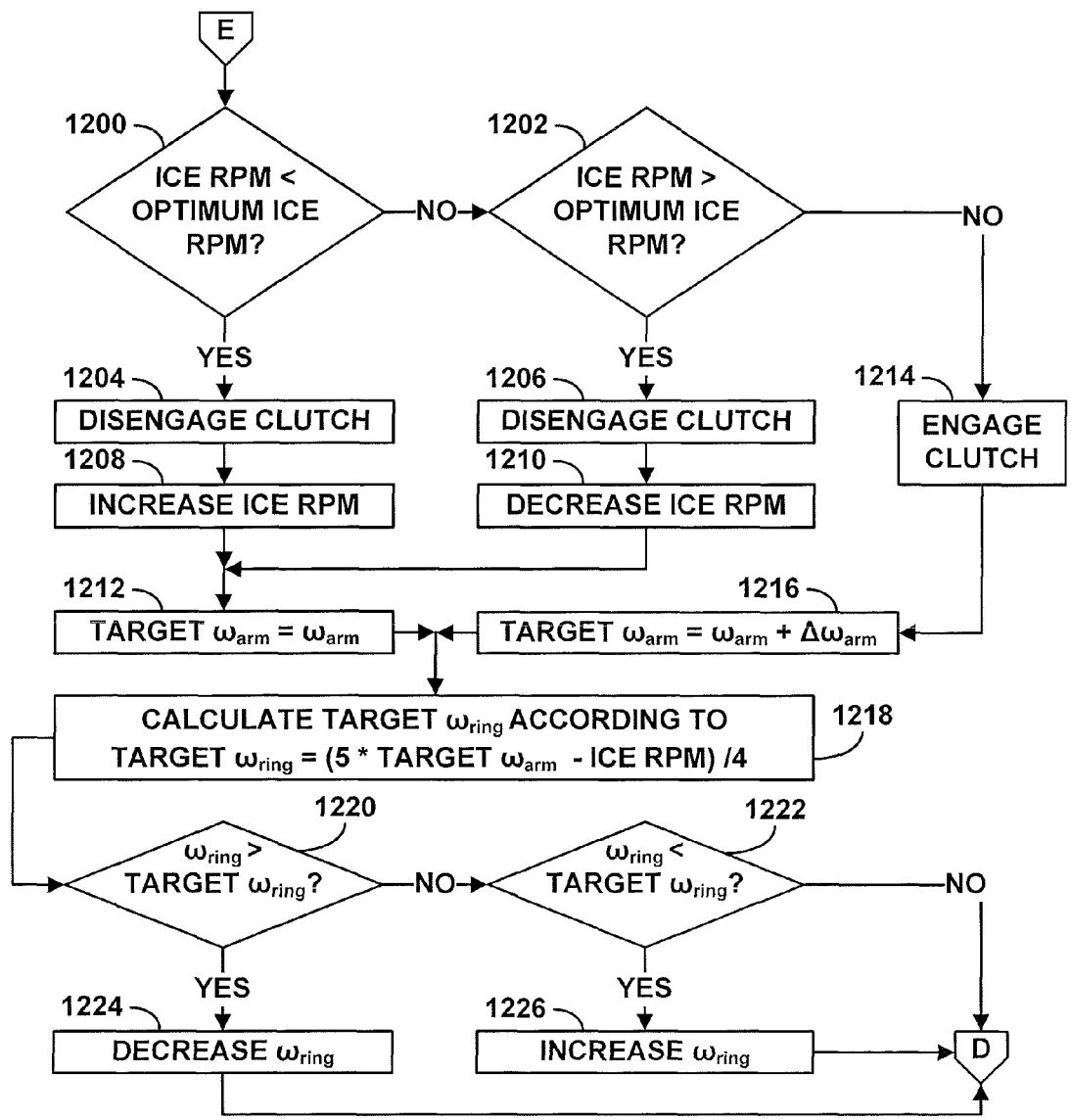
FIG. 12 is a flow diagram illustrating another portion of the process of employing formulas to modify the control parameters during an acceleration mode in which the acceleration can be achieved at the optimum ICE RPM set point.

Turning now to FIG. 12, an exemplary process for operating at the optimum set point can begin with determining whether the internal combustion engine is below the optimum set point at step 1200 or above the optimum set point at step 1202. If so, then the clutch can be disengaged at step 1204 or 1206, and the RPM of the internal combustion engine can be increased or decreased at steps 1208 or 1210, respectively. Then a target angular velocity of the arm can be set equal to the current angular velocity of the arm at step 1212. On the other hand, if the RPM of the internal combustion engine is determined to already be at the optimum set point at steps 1200 and 1202, then the clutch can be engaged at step 1214, and the target angular velocity of the arm can be set equal to the sum of the current angular velocity of the arm and the desired change in that angular velocity in order to achieve the desired rate of acceleration.

Once the value of the target angular acceleration for the arm has been determined at step 1212 or step 1216, a target angular acceleration of the ring gear can be calculated at step 1218. For example, for a five to one ratio planetary gear set, the target angular velocity of the ring gear (TARGET ωring) can be calculated according to:

TARGET ωring=(5*TARGET ωarm−ICE RPM)/4 for the target angular velocity of the arm (TARGET ωarm) and the internal combustion engine RPM (ICE RPM). In more general form, the equation can be adjusted for various planetary gear set ratios of N to one, as follows:

TARGET ωring=(N*TARGET ωarm−ICE RPM)/(N−1)

This target angular velocity of the ring gear can then be employed as a threshold for comparison to the angular velocity of the ring gear at steps 1220 and 1222 for deciding whether to adjust electric motor RPM in order to decrease or increase the angular velocity of the ring gear at step 1224 and 1226, respectively.

Figure 13:
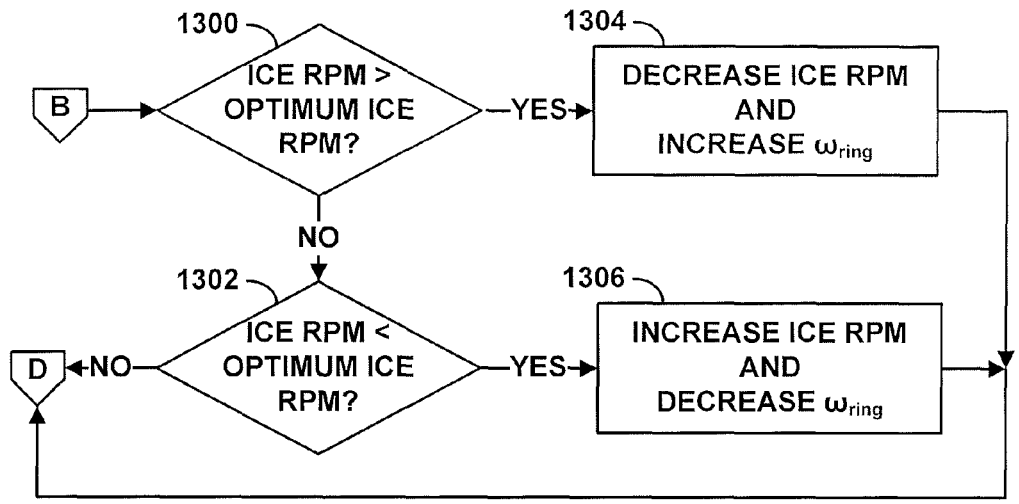
FIG. 13 is a flow diagram illustrating another portion of the process of employing formulas to modify the control parameters during a cruise mode.

Turning now to FIG. 13, a process for operating in a cruise mode can begin at steps 1300 and 1302 with determinations whether the internal combustion engine RPM is greater than or less than the optimum set point. If it is determined at step 1300 that the internal combustion engine RPM is greater than the optimum set point, then the internal combustion engine RPM can be decreased and the electric motor RPM increased to raise the angular velocity of the ring gear at step 1304. If it is determined at step 1302 that the internal combustion engine RPM is less than the optimum set point, then the internal combustion engine RPM can be increased and the electric motor RPM decreased to lower the angular velocity of the ring gear at step 1306.

Figure 14:
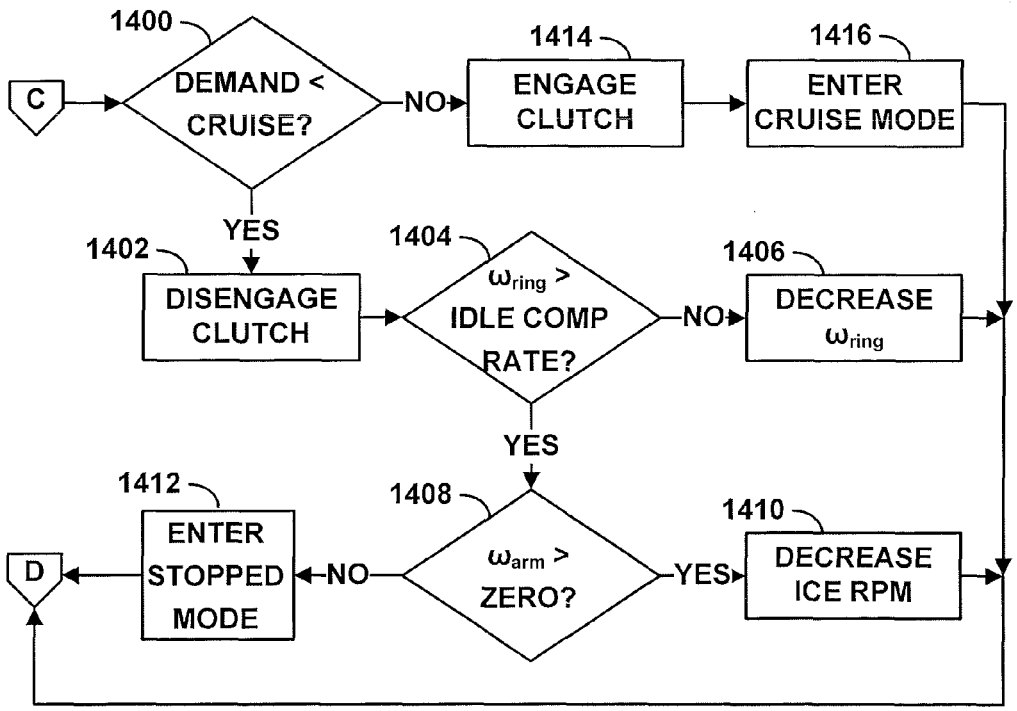
FIG. 14 is a flow diagram illustrating another portion of the process of employing formulas to modify the control parameters during a deceleration mode.

Referring to FIG. 14, a process of operating in a deceleration mode can begin by determining at step 1400 whether the demand is less than the cruise value. If so, then the process can proceed with disengaging the clutch at step 1402. Then, a determination can be made at step 1404 whether the angular velocity of the ring gear is greater than a threshold angular velocity of the ring gear at which the idle speed of the internal combustion engine is fully compensated to produce a zero angular velocity of the arm. If not, then the electric motor RPM can be decreased at step 1406 in order to lower the angular velocity of the ring gear until it reaches the idle compensation rate. However, if it is determined at step 1404 that the angular velocity of the ring gear has already been lowered to the idle compensation rate, a determination can be made at step 1408 whether the angular velocity of the arm is greater than zero. If so, then the internal combustion RPM can be decreased at step 1410. However, if it is determined at step 1408 that the vehicle is stopped and idling, then a stopped mode can be entered at step 1412. Otherwise, the deceleration and preparation for the stopped and idling mode can be performed until the demand is determined to be equal to the cruise value at step 1400, at which point the clutch can be engaged at step 1414, and the cruise mode can be entered at step 1416.

Figure 15:
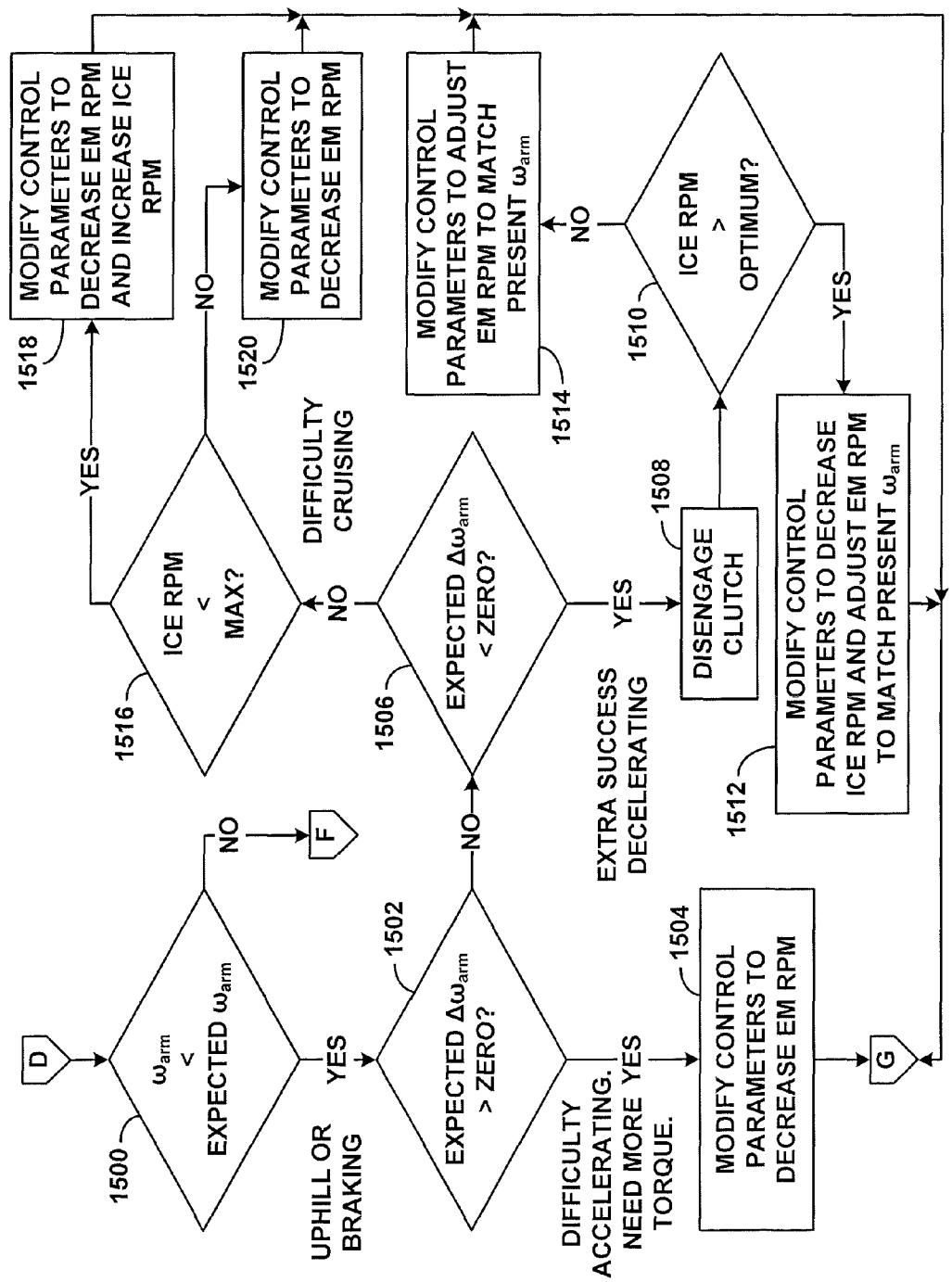
FIG. 15 is a flow diagram illustrating another portion of the process of employing formulas to modify the control parameters, including detecting an uphill or braking condition and further modifying the control parameters accordingly.

Turning now to FIG. 15, a process for adjusting modification amounts can begin at step 1500 by determining whether the angular velocity of the arm is less than the expected angular velocity of the arm. If so, then the vehicle may be traveling uphill, braking, or encountering some kind of obstacle or other condition that is unexpectedly slowing the vehicle. If so, then a further determination can be made at step 1502 whether the expected change in the angular velocity of the arm is greater than zero. If so, then a condition may be detected of difficulty accelerating, and a need for more torque. In this event, the control parameters can be modified at step 1504 to decrease the electric motor RPM in order to lower the angular velocity of the ring gear and increase torque. This step can involve overriding the parameter for the electric motor with a new value, or applying a scalar value to a determined modification amount in order to adjust to a lesser degree. The type and/or amount of values employed can vary, for example, depending on a magnitude of a difference between the expected and actual angular velocities of the arm.

If the determination made at step 1502 indicated that the expected change in the angular velocity of the arm was not greater than zero, then a further determination can be made at step 1506 whether the expected change was less than zero. If so, then a condition may be detected of extra success decelerating, such as if the vehicle is travelling downhill In response, the clutch can be disengaged at step 1508, and a determination can be made at step 1510 whether the internal combustion engine RPM is greater than the optimum set point. If so, then an adjustment can be made at step 1512 to decrease the internal combustion engine RPM and adjust the electric motor RPM to match the present angular velocity of the arm. Otherwise, the control parameters can be modified at step 1514 to adjust the electric motor RPM to match the present angular velocity of the arm.

In the event that it is determined at step 1506 that the expected change in the angular velocity of the arm was not less than zero, then a condition can be detected of difficulty cruising. In this case, a determination can be made at step 1516 whether the internal combustion RPM is less than a maximum threshold value. If so, then the control parameters can be modified at step 1518 to decrease the electric motor RPM in order to lower the angular velocity of the ring gear, while increasing the internal combustion engine RPM. On the other hand, if the internal combustion engine RPM is determined to already be at a maximum at step 1516, then the control parameters can be adjusted at step 1520 to decrease the electric motor RPM in order to lower the angular velocity of the ring gear and thereby increase torque. Again, scalar values can be employed in steps 1518 and 1520 that can vary based on a magnitude of the difference between the expected and actual angular velocities of the arm.

Figure 16:
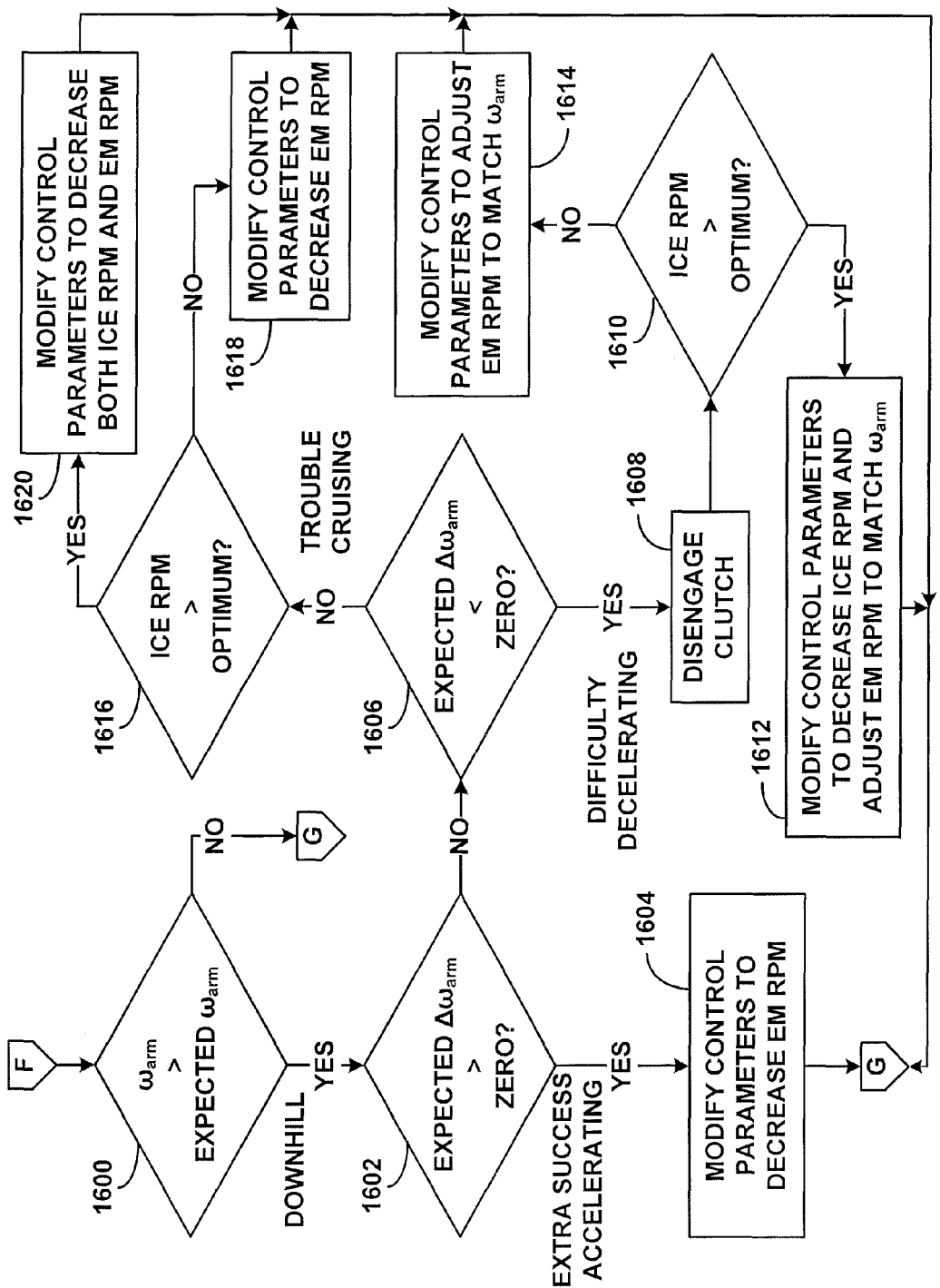
FIG. 16 is a flow diagram illustrating another portion of the process of employing formulas to modify the control parameters, including detecting a downhill condition and further modifying the control parameters accordingly.

Turning now to FIG. 16, if it is determined at step 1600 that the angular velocity of the arm is greater than expected, then a condition can be detected that the vehicle is travelling downhill. Then, if it is determined at step 1602 that the expected change in the angular velocity of the arm was greater than zero, then a condition can be detected of extra success accelerating. In this case, the control parameters can be modified at step 1604 to decrease the electric motor RPM to lower the angular velocity of the ring gear. For this step, a scalar value can be selected for scaling down the amount of acceleration, and this value can be selected based on the magnitude of the difference of the expected and actual angular velocities of the arm.

If it is determined at step 1606 that the expected change in the angular velocity of the arm was less than zero, then a condition of difficulty decelerating can be detected. In this case, the clutch can be disengaged at step 1608, and a determination can be made at step 1610 whether the internal combustion engine RPM is greater than the optimum set point. If so, then the control parameters can be modified at step 1612 to decrease the internal combustion engine RPM, and to adjust the electric motor RPM to match the angular velocity of the ring gear to complement the angular velocity of the arm. Otherwise, the control parameters can be modified at step 1614 to adjust the electric motor RPM to match the angular velocity of the ring gear to complement the angular velocity of the arm.

In the event that the expected change in angular velocity of the arm was equal to zero, then a condition can be detected of trouble cruising. In this case, a further determination can be made at step 1616 whether the internal combustion engine RPM is greater than the optimum set point. If not, then the control parameters can be modified to decrease the electric motor RPM in order to lower the angular velocity of the ring gear and thereby increase torque. For step 1618, the amount of electric motor RPM decrease can be selected based on the magnitude of the difference between the expected and actual angular velocities of the arm. Otherwise, the control parameters can be modified at step 1620 in order to decrease both the internal combustion RPM and the electric motor RPM. For step 1620, a scalar values can be selected for scaling up the amount of decrease in the internal combustion engine RPM and scaling down the amount of increase in the electric motor RPM, and these value can be selected based on the magnitude of the difference of the expected and actual angular velocities of the arm.

Thus, it is apparent that there has been provided, in accordance with the present disclosure, an infinitely variable transmission that satisfies one or more of the advantages set forth above. Although the preferred embodiment has been described in detail, it should be understood that various changes, substitutions, and alterations can be made herein without departing from the scope of the present disclosure, even if all of the advantages and benefits identified above are not present. For example, the various embodiments and examples shown in the drawings and descriptions provided herein illustrate that the present disclosure may be implemented and embodied in numerous different ways that still fall within the scope of the present disclosure, whether expressly shown herein or not. For example, the various elements or components may be combined or integrated in another system or certain features may not be implemented. Also, the techniques, systems, sub-systems, and methods described and illustrated in the preferred embodiment as discrete or separate may be combined or integrated with other systems, designs, techniques, or methods without departing from the scope of the present disclosure. For example, the infinitely variable transmission can be used with a wide variety of types of automotive vehicles, including those not specifically discussed herein. Other examples of changes, substitutions, and alterations are readily ascertainable by one skilled in the art and could be made without departing from the spirit and scope of the present disclosure.

What is claimed is:

1. An infinitely variable transmission for use with an automotive vehicle, the infinitely variable transmission comprising:
    a planetary gear set having a first input component, a second input component, and an output component, wherein the first input component comprises a drive shaft input component,
    wherein the planetary gear set is positioned relative to a drivetrain of the automotive vehicle such that a drive shaft driven by an internal combustion engine of the automotive vehicle is connected to the drive shaft input component, and the output component is connected to an output shaft configured to drive a motivational mechanism of the automotive vehicle;
    an electrical motor configured to drive the second input component through a gear set interface; and
    an electronic control unit configured to control at least the electrical motor in response to a torque demand and in a manner to satisfy the torque demand by either:
        (a) operating the internal combustion engine at a set point associated with a particular efficiency, while modifying an angular velocity of the electrical motor to satisfy the torque demand; or
        (b) operating the internal combustion engine in a manner that deviates from the particular efficiency such that the torque demand is satisfied.

2. The infinitely variable transmission of claim 1, wherein the gear set interface comprises a worm gear set.

3. The infinitely variable transmission of claim 2, wherein the worm gear set has a helix angle selected to effect a balance between worm gear teeth friction and a load of the second input component, such that power required to drive the worm gear set is minimized for input load conditions.

4. The infinitely variable transmission of claim 1, wherein the particular efficiency is an optimum efficiency.

5. The infinitely variable transmission of claim 1, wherein the output component comprises a planetary carrier of the planetary gear set, the drive shaft input component comprises a sun gear of the planetary gear set, and the second input component comprises a ring gear of the planetary gear set.

6. The infinitely variable transmission of claim 1, wherein operating the internal combustion engine in a manner that deviates from the particular efficiency such that the torque demand is satisfied, comprises operating the internal combustion engine in a manner that deviates from the particular efficiency only to an extent necessary to satisfy the torque demand.

7. The infinitely variable transmission of claim 1, wherein the electronic control unit is operatively connected, during a start mode of operation, to:
    (i) operate the electrical motor in a direction to turn the drive shaft input component to start the internal combustion engine of the automotive vehicle, while a clutch is engaged;
    (ii) perform detection of a starting of the internal combustion engine of the automotive vehicle; and
    (iii) in response to the detection of the starting of the internal combustion engine, disengage the clutch to allow the internal combustion engine to reach an idle speed.

8. The infinitely variable transmission of claim 1, wherein the electronic control unit is operatively connected, during a start mode of operation, to:
    (i) operate the electrical motor in a direction to turn the drive shaft input component to start the internal combustion engine of the automotive vehicle, while a clutch is engaged;
    (ii) perform detection of a starting of the internal combustion engine of the automotive vehicle; and
    (iii) in response to the detection of the starting of the internal combustion engine, operate the electrical motor at an angular velocity to allow the internal combustion engine to operate at an idle speed.

9. The infinitely variable transmission of claim 1, wherein the electronic control unit is operatively connected, during a reverse mode of operation, to:
    operate the electrical motor at an angular velocity to satisfy the torque demand while moving the automotive vehicle in reverse; and
    respond to at least one of a state of a brake signal or a setting of a clutch of the automotive vehicle by operating the electrical motor at an angular velocity to match the angular velocity of the drive shaft input component to the angular velocity of the drive shaft.

10. The infinitely variable transmission of claim 1, wherein the electronic control unit is operatively connected, during a drive mode of operation, to:
    operate the electrical motor at an angular velocity to satisfy the torque demand while moving the automotive vehicle forward; and
    respond to at least one of a state of a brake signal or a setting of a clutch connecting the drive shaft to the drive shaft input component by operating the electrical motor at an angular velocity to match the angular velocity of the drive shaft input component to the angular velocity of the drive shaft.

11. The infinitely variable transmission of claim 1, wherein:

the torque demand is indicated by an accelerator pedal signal generated by an accelerator pedal of the automotive vehicle;

the electronic control unit is operatively connected to receive RPM signals indicative of angular velocity of the drive shaft and angular velocity of the electrical motor; and the electronic control unit is operatively connected to (a) determine one or more operational parameters based at least in part on the accelerator pedal signal, the angular velocity of the drive shaft, and the angular velocity of the electrical motor, and (b) apply the one or more operational parameters to modify the angular velocity of the drive shaft and the angular velocity of the electrical motor.

12. The infinitely variable transmission of claim 1, wherein:

the electronic control unit is configured to receive:
(a) at least one of: (i) a brake signal generated by a brake pedal of the automotive vehicle, or (ii) a state of a clutch that connects the drive shaft to the drive shaft input component, and
(b) a signal indicative of angular velocity of at least one of the motivational mechanism of the automotive vehicle or the output shaft;

the electronic control unit is configured to determine, conditioned on a state of at least one of the brake signal or the clutch, one or more operational parameters based on at least one of the angular velocity of the motivational mechanism or the angular velocity of the output shaft; and the electronic control unit is operatively connected to apply the one or more operational parameters to control the angular velocity of the drive shaft and the angular velocity of the electrical motor in a manner to match the angular velocity of the drive shaft input component to the angular velocity of the drive shaft.

13. The infinitely variable transmission of claim 1, wherein one or more operational parameters are determined using at least one from the group consisting of: a datastore, a data look-up table, a formula, and a data map.

14. A method of operation for use with an infinitely variable transmission of an automotive vehicle, the method comprising:

receiving, by an electronic control unit of the automotive vehicle, a torque demand generated, at least in part, by an operator of the automotive vehicle;

controlling, by the electronic control unit, an electrical motor in response to the torque demand in a manner to satisfy the torque demand by either:
(a) operating, by the electronic control unit, an internal combustion engine of the automotive vehicle at a set point associated with a particular efficiency, while modifying, by the electronic control unit, an angular velocity of the electrical motor to satisfy the torque demand, or
(b) operating, by the electronic control unit, the internal combustion engine in a manner that deviates from the particular efficiency such that the torque demand is satisfied;

wherein the electrical motor is configured to drive a gear interfaced with an input component of a planetary gear set, the planetary gear set being positioned relative to a drivetrain of the automotive vehicle such that a drive shaft driven by the internal combustion engine is connected to a drive shaft input component of the planetary gear set, and an output component of the planetary gear set is connected to an output shaft for driving a motivational mechanism of the automotive vehicle.

15. The method of claim 14, wherein the gear interfaced with the input component comprises a worm gear set.

16. The method of claim 15, wherein the gear interfaced with the input component has a helix angle selected to effect a balance between worm gear teeth friction and load of the input component, such that power required to drive the gear is minimized for input load conditions.

17. The method of claim 14, wherein the particular efficiency is an optimum efficiency.

18. The method of claim 14, wherein the input component comprises a ring gear of the planetary gear set, the drive shaft input component comprises a sun gear of the planetary gear set, and the output component comprises a planetary carrier of the planetary gear set.

19. The method of claim 14, wherein operating, by the electronic control unit, the internal combustion engine in a manner that deviates from the particular efficiency such that the torque demand is satisfied, comprises operating the internal combustion engine in a manner that deviates from the particular efficiency only to an extent necessary to satisfy the torque demand.

20. The method of claim 14, further comprising:
during a start mode of operation:
(i) operating, by the electronic control unit, the electrical motor in a direction to turn the drive shaft input component to start the internal combustion engine of the automotive vehicle, while a clutch is engaged;
(ii) performing, by the electronic control unit, detection of a starting of the internal combustion engine of the automotive vehicle; and
(iii) in response to the detection of the starting of the internal combustion engine, disengaging the clutch to allow the internal combustion engine to reach an idle speed.

21. The method of claim 14, further comprising:
during a start mode of operation:
(i) operating, by the electronic control unit, the electrical motor in a direction to turn the drive shaft input component to start the internal combustion engine of the automotive vehicle, while a clutch is engaged;
(ii) performing, by the electronic control unit, detection of a starting of the internal combustion engine of the automotive vehicle; and
(iii) in response to the detection of the starting of the internal combustion engine, operating the electrical motor at an angular velocity to allow the internal combustion engine to operate at an idle speed.

22. The method of claim 14, further comprising:
during a reverse mode of operation, operating, by the electronic control unit, the electrical motor at an angular velocity to satisfy the torque demand while moving the automotive vehicle in reverse; and
during the reverse mode of operation, responding, by the electronic control unit, to at least one of a state of a brake signal or a setting of a clutch of the automotive vehicle by operating the electrical motor at an angular velocity to match the angular velocity of the drive shaft input component to the angular velocity of the drive shaft.

23. The method of claim 14, further comprising:
during a drive mode of operation:
operating, by the electronic control unit, the electrical motor at an angular velocity to satisfy the torque demand while moving the automotive vehicle forward; and
responding to at least one of a state of a brake signal or a setting of a clutch connecting the drive shaft to the drive shaft input component by operating the electrical motor at an angular velocity to match the angular velocity of the drive shaft input component to the angular velocity of the drive shaft.

24. The method of claim 14, further comprising:
receiving, by the electronic control unit, the torque demand as an accelerator pedal signal generated by an accelerator pedal of the automotive vehicle;
receiving, by the electronic control unit, a first RPM signal indicative of angular velocity of the drive shaft;
receiving, by the electronic control unit, a second RPM signal indicative of angular velocity of the electrical motor;
determining, by the electronic control unit, one or more operational parameters based at least in part on the accelerator pedal signal, the angular velocity of the drive shaft, and the angular velocity of the electrical motor; and
applying, by the electronic control unit, the operational parameters to control the angular velocity of the drive shaft and the angular velocity of the electrical motor.

25. The method of claim 14, further comprising:
receiving, by the electronic control unit, a brake signal generated by a brake pedal of the automotive vehicle;
receiving, by the electronic control unit, a signal indicative of at least one of an angular velocity of the motivational mechanism of the automotive vehicle or an angular velocity of the output shaft;
conditioned on a state of the brake signal, determining, by the electronic control unit, one or more operational parameters based at least in part on at least one of the angular velocity of the motivational mechanism or the angular velocity of the output shaft; and
applying, by the electronic control unit, the one or more operational parameters to control the angular velocity of the drive shaft and the angular velocity of the electrical motor in a manner to match the angular velocity of the drive shaft input component to the angular velocity of the drive shaft.

26. The method of claim 14, wherein one or more operational parameters are determined using at least one from the group consisting of: a datastore, a data look-up table, a formula, and a data map.

27. An infinitely variable transmission for use with an automotive vehicle, the infinitely variable transmission comprising:
a planetary gear set having a first input component, a second input component, and an output component, the planetary gear set operable to be coupled to a drivetrain of the automotive vehicle such that the first input component is coupled to a drive shaft driven by an engine of the automotive vehicle, and the output component is connected to an output shaft configured to drive a motivational mechanism of the automotive vehicle;
an electrical motor connected to drive the second input component through a gear set interface; and
an electronic control unit operable to control the electrical motor in response to a torque demand generated at least in part by the automotive vehicle and in a manner to satisfy the torque demand by either:
(a) operating the engine at a set point associated with a particular efficiency, while modifying an angular velocity of the electrical motor to satisfy the torque demand; or
(b) operating the engine in a manner that deviates from the particular efficiency such that the torque demand is satisfied.

28. The infinitely variable transmission of claim 27, wherein the gear set interface comprises a worm gear set.

29. The infinitely variable transmission of claim 27, wherein the output component comprises a planetary carrier of the planetary gear set, the first input component comprises a sun gear of the planetary gear set, and the second input component comprises a ring gear of the planetary gear set.

30. The infinitely variable transmission of claim 27, wherein the particular efficiency is an optimum efficiency.

* * * * *